US009434160B2

(12) United States Patent
Sumikawa et al.

(10) Patent No.: US 9,434,160 B2
(45) Date of Patent: Sep. 6, 2016

(54) RECORDING HEAD FOR INK JET RECORDING, INK JET RECORDING APPARATUS, AND INK JET RECORDING METHOD

(71) Applicant: CANON FINETECH INC., Misato-shi, Saitama-ken (JP)

(72) Inventors: Yuusuke Sumikawa, Kashiwa (JP); Shintaro Suzuki, Yashio (JP)

(73) Assignee: Canon Finetech, Inc., Misato-shi (JP)

( * ) Notice: Subject to any disclaimer, the term of this patent is extended or adjusted under 35 U.S.C. 154(b) by 0 days.

(21) Appl. No.: 14/468,682

(22) Filed: Aug. 26, 2014

(65) Prior Publication Data

US 2015/0070422 A1 Mar. 12, 2015

(30) Foreign Application Priority Data

Sep. 6, 2013 (JP) ................................ 2013-185451

(51) Int. Cl.

| | |
|---|---|
| ***G01D 11/00*** | (2006.01) |
| ***B41J 2/14*** | (2006.01) |
| ***B41J 2/155*** | (2006.01) |
| ***B41J 2/16*** | (2006.01) |
| ***B41J 2/21*** | (2006.01) |

(52) U.S. Cl.

CPC ........... *B41J 2/14016* (2013.01); *B41J 2/1433* (2013.01); *B41J 2/155* (2013.01); *B41J 2/1601* (2013.01); *B41J 2/2107* (2013.01); *B41J 2002/14403* (2013.01)

(58) Field of Classification Search

CPC .... B41J 2/14016; B41J 2/155; B41J 2/2107; B41J 2/1433; B41J 2002/14403

See application file for complete search history.

(56) References Cited

U.S. PATENT DOCUMENTS

| | | | | |
|---|---|---|---|---|
| 5,764,261 | A | 6/1998 | Koike et al. | |
| 6,402,311 | B1 * | 6/2002 | Inoue et al. | 347/92 |
| 7,648,943 | B2 | 1/2010 | Fujiwara et al. | |

(Continued)

FOREIGN PATENT DOCUMENTS

| | | | |
|---|---|---|---|
| EP | 0468647 | A1 | 1/1992 |
| EP | 0468648 | A1 | 1/1992 |

(Continued)

OTHER PUBLICATIONS

Extended European Search Report in European Patent Application No. 14183322.8, dated Jun. 5, 2015.

(Continued)

*Primary Examiner* — Julian Huffman

(74) *Attorney, Agent, or Firm* — Fitzpatrick, Cella, Harper & Scinto

(57) ABSTRACT

An ink jet recording head, includes a nozzle array of nozzle flow paths; ink ejection orifices communicating with the nozzle flow paths; heaters in the nozzle flow paths; and ink with which the head is filled. The ink contains a coloring material, an acetylene glycol-based surfactant, and water, the surfactant containing one or more kinds of an acetylene glycol or an ethylene oxide adduct thereof, an average addition number of moles of ethylene oxide of the whole surfactant being 3 to 7. The ink has a viscosity of 1.5 mPa·s to 3.0 mPa·s. The head is a line type head having an opening area of each ink ejection orifice of 100 $\mu m^2$ to 350 $\mu m^2$, a total number of nozzles of 1,200 or more, and a length of the nozzle array of 2 inches or more, and the head is driven at a frequency of 1 kHz to 10 kHz.

5 Claims, 7 Drawing Sheets

(56) References Cited

U.S. PATENT DOCUMENTS

| | | | |
|---|---|---|---|
| 8,602,544 B2 | 12/2013 | Kawabe et al. | |
| 2002/0113849 A1* | 8/2002 | Hawkins | B41J 2/03 347/77 |
| 2007/0283845 A1 | 12/2007 | Mizusaki et al. | |
| 2008/0124476 A1 | 5/2008 | Tanba | |
| 2013/0278689 A1* | 10/2013 | Sowinski et al. | 347/90 |
| 2014/0055526 A1 | 2/2014 | Hsueh et al. | |

FOREIGN PATENT DOCUMENTS

| | | | |
|---|---|---|---|
| EP | 0468649 | A1 | 1/1992 |
| EP | 1167474 | A1 | 1/2002 |
| JP | 06-025573 | A | 2/1994 |
| JP | 07-228808 | A | 8/1995 |
| JP | 8-176971 | A | 7/1996 |
| JP | 2004-175935 | A | 6/2004 |
| JP | 2006-143989 | A | 6/2006 |
| JP | 2008-133324 | A | 6/2008 |
| JP | 2011-140636 | A | 7/2011 |
| JP | 2013-014111 | A | 1/2013 |
| WO | 02/14072 | A1 | 2/2002 |

OTHER PUBLICATIONS

Office Action in Japanese Patent Application No. 2013-185451, dated Jun. 23, 2015.

* cited by examiner

RECORDING HEAD FOR INK JET RECORDING, INK JET RECORDING APPARATUS, AND INK JET RECORDING METHOD

BACKGROUND OF THE INVENTION

1. Field of the Invention

The present invention relates to a recording head for ink jet recording, an ink jet recording apparatus, and an ink jet recording method.

2. Description of the Related Art

Ink jet recording apparatus have advantages of their low noise, low running cost, easiness of downsizing, easiness of colorization, and the like, and are currently widely applied not only to a printer but also to a copying machine and the like.

In the ink jet recording apparatus, ability of ejecting ink with stability in high speed printing (stability of ejection) is important. As a measure to improve the stability of ejection, for example, a method has been proposed, which uses an ink composition containing an aqueous medium having an electric conductivity of 250 μS/cm or less (at 25° C.), a dye, and an alkylene glycol compound in which ethylene oxide and propylene oxide are added (Japanese Patent Application Laid-Open No. 2004-175935). In Japanese Patent Application Laid-Open No. 2004-175935, it is described that the ink composition is excellent in stability of ejection and a high speed printing can be carried out continuously with stability by use of the ink composition.

Another method has been proposed, which uses ink for ink jet recording containing, in addition to a water-soluble dye and an acetylene glycol (or a derivative thereof), a lower alkyl ether of a polyhydric alcohol and benzotriazole (Japanese Patent Application Laid-Open No. H07-228808). In Japanese Patent Application Laid-Open No. H07-228808, it is described that the ink maintains the stability of ejection even under a high speed driving condition.

By the way, as a recording method of an ink jet recording apparatus, a serial system is hitherto mainstream in which printing is carried out by horizontally reciprocating a recording head while a sheet is fed. However, in recent years, instead of the serial system, a line system is becoming adopted in which a recording head wider than the width of the sheet (line type head) is used and printing is carried out in one pass in a state in which only the sheet is fed without moving the line type head. In the line system, a sheet is fed under a fixed line type head and printing can be carried out in a stroke. Thus, the line system is suitable for high-speed printing and is becoming adopted in the field of printers for industrial use in which high image quality and high-speed printing are required.

In the line system, an extremely higher level of stability of ejection than before is required for the following reasons.

(1) In order to realize printing of high image quality, it is necessary to reduce an opening area of an ink ejection orifice and to reduce an ink amount (ejected amount) per ink droplet as much as possible to increase definition of an image. When the opening area of an ink ejection orifice is small in this way, the ink tends to thicken around the ejection orifice, and the stability of ejection of the ink is liable to be impaired.

(2) When the ink amount per ink droplet is reduced as much as possible as described above, printing of high image quality cannot be realized unless the image data amount and the number of recording dots are increased. Then, it is necessary to increase drive frequency of the recording head when ejecting ink to increase the number of times of ink ejection per unit time and in turn to increase the amount of provided ink. In particular, when printing of high image quality is attempted to be carried out at high speed, the drive frequency is set at an extremely high level. Under such a high drive frequency condition, ink ejection may be unstable unless ink can be supplied promptly in response to high speed ink ejection.

(3) In the serial system, the head (nozzles) passes one location on the sheet a plurality of times, and a plurality of nozzles pass one location on the sheet. Therefore, even when one nozzle is defective, other nozzles can cover for the defective nozzle to inhibit lowering of the image quality. On the other hand, in the line system, the head passes one location on the sheet only once, and only one nozzle passes one location on the sheet. Therefore, in the line system, ink ejection becomes unstable even when only one nozzle is defective. Ejection failure of a nozzle (non-ejection nozzle) through which ink is not ejected immediately becomes a cause of lowering the image quality. Therefore, stability of ejection at a still higher level than that in the case of the serial system is required.

As described above, a line type head is required to continuously print a high quality image at high speed with excellent stability of ejection under a high drive frequency condition.

However, even when the ink composition described in Japanese Patent Application Laid-Open No. 2004-175935 or the ink described in Japanese Patent Application Laid-Open No. H07-228808 is used for a line type head, stability of ejection at the high level as described above cannot be realized. For example, there is a problem in that, when a high quality image is continuously printed at high speed under a high drive frequency condition, ink ejection becomes unstable and ejection failure of a nozzle occurs.

SUMMARY OF THE INVENTION

The present invention has been made to solve the related-art problems described above. Specifically, the present invention provides a line type head with which, even when a high quality image is continuously printed at high speed under a high drive frequency condition, stability of ejection is less liable to be lowered and ejection failure of a nozzle (non-ejection nozzle) is less liable to occur.

The inventors of the present invention have earnestly studied the above-mentioned problems and found that the problems can be solved by using, for a line type head having a predetermined structure, ink containing one or two or more kinds of acetylene glycols or ethylene oxide adducts thereof as an acetylene glycol-based surfactant, and the average addition number of moles of ethylene oxide of the entirety thereof is 3 or more and 7 or less, and by accurately controlling viscosity of the ink, to thereby achieve the present invention. According to the present invention, the following recording head, ink jet recording apparatus, and ink jet recording method are provided.

Recording Head

According to one embodiment of the present invention, a recording head for ink jet recording is provided in which, a nozzle array including a plurality of nozzle flow paths partitioned by nozzle walls is formed, a plurality of ink ejection orifices communicating with the nozzle flow paths, respectively, are formed, and heaters for ink ejection are disposed in the nozzle flow paths, respectively. The recording head is a line type head having an opening area of each of the ink ejection orifices of 100 $\mu m^2$ or more and 350 $\mu m^2$ or less, a total number of nozzles in the nozzle array of 1,200 or more, and a length of the nozzle array of 2 inches or more. The line type head is configured to be driven at a drive frequency of 1 kHz or more and 10 kHz or less. Internal space of the recording head communicating with the ink ejection orifices is filled with ink for ink jet recording. The ink contains a coloring material, an acetylene glycol-based surfactant, and water. As the acetylene glycol-based surfactant, one or two or more kinds of acetylene glycols or ethylene oxide adducts thereof is contained. The average addition number of moles of ethylene oxide of the entirety thereof is 3 or more and 7 or less. The ink has a viscosity of 1.5 mPa·s or more and 3.0 mPa·s or less.

According to one embodiment of the present invention, in the recording head, even when a high quality image is continuously printed at high speed under a high drive frequency condition, stability of ejection is less liable to be lowered and ejection failure of a nozzle (non-ejection nozzle) is less liable to occur.

Further features of the present invention will become apparent from the following description of exemplary embodiments with reference to the attached drawings.

DESCRIPTION OF THE EMBODIMENTS

Now, the present invention will be described in detail. However, the present invention is not limited to the following embodiments and comprehends all objects having matters to define the invention. Note that, the term "recording" as used herein comprehends not only the case where meaningful information such as a letter, a figure, or a symbol is formed on a recording medium but also the case where an image, design, pattern, or the like having no particular meaning is formed thereon.

(1) Recording Head

A recording head according to the present invention is a recording head of a so-called thermal system in which a heater for ink ejection is disposed in each of nozzle flow paths. The recording head is a line type head having a predetermined structure in which an opening area of each of ink ejection orifices, a total number of nozzles in a nozzle array, a length of the nozzle array, and a drive frequency are predetermined. Internal space of the recording head communicating with the ink ejection orifices is filled with ink which contains one or two or more kinds of acetylene glycol-based surfactants having a predetermined constitution. The average addition number of moles of ethylene oxide of the entirety thereof is 3 or more and 7 or less. The ink has a viscosity within a predetermined range.

Now, a recording head according to one embodiment of the present invention will be described with reference to the accompanying drawings. However, the recording head according to the present invention is not limited to a structure described below.

(1-1) Structure of Nozzle Portion

Figure 1A:
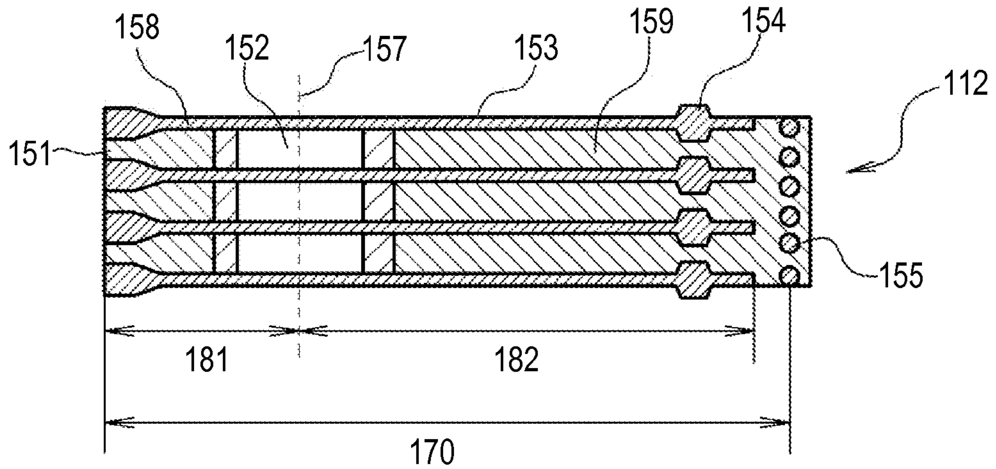
FIG. 1A is a top view schematically illustrating an internal structure of nozzles of a recording head.
Figure 1B:
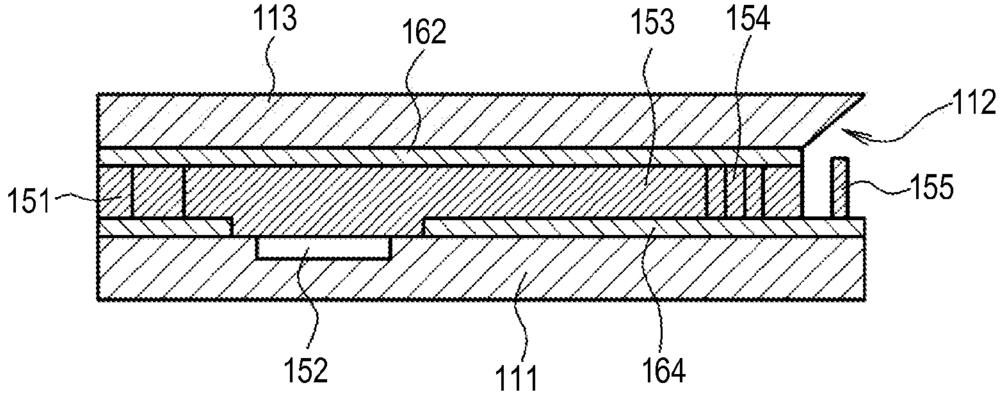
FIG. 1B is a side view schematically illustrating the internal structure of the nozzle illustrated in FIG. 1A.
Figure 1C:
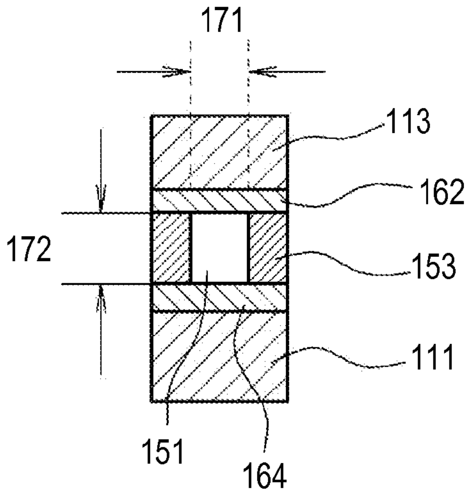
FIG. 1C is a front view schematically illustrating an ink ejection orifice of the nozzle illustrated in FIG. 1A.

First, a structure of a nozzle portion will be described with reference to FIG. 1A to FIG. 1C. FIG. 1A is a top view schematically illustrating an internal structure of nozzles of the recording head. FIG. 1B is a side view schematically illustrating the internal structure of the nozzle illustrated in FIG. 1A. FIG. 1C is a front view schematically illustrating an ink ejection orifice of the nozzle illustrated in FIG. 1A.

In the recording head of the thermal system, as illustrated in FIG. 1A, a nozzle array is formed of a plurality of nozzle flow paths 159 partitioned by nozzle walls 153, a plurality of ink ejection orifices 151 communicating with the nozzle flow paths 159 are formed, and a heater 152 for ink ejection is disposed in each of the nozzle flow paths 159. The head having such a structure can cause an ink droplet to fly from the ink ejection orifice 151 by heating ink with which the nozzle flow path 159 is filled by the heater 152 so as to generate a bubble in the ink.

As illustrated in FIG. 1A and FIG. 1B, a nozzle filter 155 configured to trap foreign matters suspended in an ink flow path in the recording head is disposed between the nozzle flow paths 159 and a common liquid chamber 112. Further, a top board member 113 to which a nozzle top board 162 is bonded is provided with an ink supply opening (not shown) formed by anisotropic etching or the like so as to allow outside ink to be introduced from the common liquid chamber 112 to the nozzle flow paths 159.

Right and left side surfaces of each nozzle flow path 159 are partitioned by the nozzle walls 153. In addition, an upper surface side of the nozzle flow path 159 is partitioned by the nozzle top board 162, and a bottom surface side thereof is partitioned by a nozzle bottom board 164. That is, the nozzle flow path 159 is an internal space having a substantially quadrangular prism shape partitioned from a surrounding space with the nozzle walls 153, the nozzle top board 162, and the nozzle bottom board 164 as partition walls. The nozzle top board 162 is bonded to the top board member 113 composed of Si or the like, and the nozzle bottom board 164 is bonded to a heater substrate 111.

The ink ejection orifice 151 is an opening portion configured to eject ink, the opening being formed at one end of the nozzle flow path 159, and communicates with the common liquid chamber 112 via the nozzle flow path 159. The ink ejection orifice 151 is formed in a face surface. In the example illustrated in FIG. 1C, the face surface is formed integrally with the nozzle walls 153, but may be formed by providing a face plate separately. The opening area of the ink ejection orifice 151 is set to 100 $\mu m^2$ or more and 350 $\mu m^2$ or less. When the opening area is set to 100 $\mu m^2$ or more, the formation of a non-ejection nozzle can be prevented. On the other hand, when the opening area is set to 350 $\mu m^2$ or less, minute liquid droplets in which the amount of one ink droplet is 10 picoliters (pL) or less can be formed, and a resolution of 600 dpi or more can be achieved. Note that, the opening area is represented by a product of an ejection orifice width 171 and an ejection orifice height 172.

The recording head is a line type head, in which a plurality of nozzle flow paths form a nozzle array. The number of nozzle flow paths which form the nozzle array is not particularly limited. However, in order to exhibit the effects of the present invention, it is necessary that the total number of nozzles in the nozzle array be 1,200 or more. It is preferred that the total number of nozzles in the nozzle array be 1,200 or more and 9,600 or less, and it is further preferred that the total number of nozzles in the nozzle array be 1,200 or more and 4,800 or less. Further, it is necessary that the length of the nozzle array be 2 inches (50.8 mm) or more, and it is preferred that the length of the nozzle array be 2 inches (50.8 mm) or more and 4 inches (101.6 mm) or less.

The heater 152 is a heating unit configured to heat ink with which the nozzle flow path 159 is filled to generate bubbles in the ink. The heater 152 is disposed on the heater substrate 111. As the heater 152, a resistor (for example, a resistor made of tantalum nitride or the like) can be used. Electrodes (not shown) made of aluminum or the like for electric conduction are connected to the heater 152, and a switching transistor (not shown) configured to control the electric conduction to the heater 152 is connected to one of the electrodes. The drive of the switching transistor is controlled by an integrated circuit (IC) formed of a circuit such as a gate element for control, and the switching transistor is driven with a predetermined pattern by a signal from outside of the recording head.

The recording head can be driven by a drive frequency of 1 kHz or more and 10 kHz or less. As the recording head is driven by the drive frequency of 1 kHz or more, the amount of ink provided per unit time can be increased to increase the amount of image data and the number of recording dots even when the amount of ink per droplet is extremely small. In other words, a high quality image can be printed at high speed. As the recording head is driven by the drive frequency of 10 kHz or less, such an inconvenience is inhibited that the stability of ejection is reduced due to an insufficient supply amount of ink to the nozzle with respect to the amount of ejected ink in high speed printing as described above. In order to obtain the above-mentioned effects with more reliability, it is preferred that the recording head be driven by a drive frequency of 3 kHz or more and 8 kHz or less. Further, it is also preferred that the recording head according to the present invention be driven by a drive frequency of 6 kHz or more and 10 kHz or less, because the stability of ejection is less liable to be reduced and ejection failure of the nozzle is less liable to occur even on the high drive frequency condition.

It is preferred that the total length of the nozzle be set to 200 μm or more and 300 μm or less. The "total length of the nozzle" in this case means the length of the nozzle flow path 159 and specifically means a length from an end on the side of the ink ejection orifice 151 to an end on the side of the common liquid chamber 112 of the nozzle wall 153 forming the nozzle flow path 159.

The nozzle flow path 159 is divided into a nozzle front portion 181, which is a portion from a heater center 157 to the end on the side of the ink ejection orifice 151, and a nozzle back portion 182, which is a portion from the heater center 157 to the end on the side of the common liquid chamber 112. From the viewpoint of an ejection speed, it is preferred that a flow resistance (front resistance) of the nozzle front portion 181 and a flow resistance (back resistance) of the nozzle back portion 182 satisfy such a relationship that a value of front resistance/back resistance is 0.3 or more and 0.8 or less. Note that, the flow resistance can be determined by calculation according to the Hagen-Poiseuille law from values such as a flow path sectional area, flow path length, and viscosity of ink to be ejected. That is, when ink to be used (and its viscosity) is determined, the value of front resistance/back resistance can be adjusted by the flow path sectional area of a nozzle, flow path length, and the like.

(1-2) Nozzle Material

The nozzle wall 153, the nozzle top board 162, and the nozzle bottom board 164 partitioning the nozzle flow path 159 can each be formed of, for example, a photosensitive resin. As the photosensitive resin, a negative photoresist or the like may be used. Specific examples of a commercial product may include: "SU-8 Series" and "KMPR-1000" (manufactured by Kayaku Microchem); and "TMMR," "TMMR S2000," and "TMMF S2000" (manufactured by TOKYO OHKA KOGYO CO., LTD.). Of those, an epoxy-based photosensitive resin excellent in solvent resistance and strength as a nozzle wall is preferably used. A particularly preferred commercial product is specifically, for example, "TMMR S2000" manufactured by TOKYO OHKA KOGYO CO., LTD.

(1-3) Hydrophilic Region, Water-Repellent Region

The recording head of the present invention is preferably such that a hydrophilic region or a water-repellent region is formed on the peripheral edge of an ink ejection orifice. Which one of the hydrophilic region and the water-repellent region is formed has only to be determined in consideration of the kind of the coloring material of the ink to be used and the surface tension of the ink.

For example, when an ink whose coloring material is a pigment or whose surface tension is 34 mN/m or less is used, a recording head (hydrophilic head) in which a hydrophilic region is formed on the peripheral edge of an ink ejection orifice is preferred. In addition, a hydrophilic region having a contact angle with the ink to be used of 60° or less is preferably formed on the peripheral edge of the ink ejection orifice, and a hydrophilic region having a contact angle of 0° (that is, forming no contact angle) is more preferably formed. Note that, the contact angle of a hydrophilic region or a water-repellent region can be measured in conformity with JIS R 3257 by a contact angle meter (such as a product available under the trade name "SImage-mini" from Excimer Inc.) by an ATAN1/2θ method. Contact angles are measured by the method in Examples to be described later as well.

The hydrophilic region can be formed by a method of forming a member (face material) in which an ink ejection orifice is composed of a hydrophilic material, a method of subjecting the surface (face surface) of the face material to hydrophilic treatment, a method of providing a hydrophilic film to the face surface, or the like.

As the face material, a resin such as an epoxy resin, in particular, an epoxy-based photosensitive resin can be used.

As the method of subjecting a face surface to hydrophilic treatment, there may be given a method of roughening the face surface. Examples of the surface roughening method may include laser irradiation, $UV/O_3$ treatment, plasma treatment, heat treatment, oxidation treatment, and embossing treatment. Lasers which may be used in the laser irradiation include an excimer laser, a YAG laser, a $CO_2$ laser, and the like. Further, a peripheral edge portion of an ink ejection orifice may also be treated by a method of soaking the peripheral edge portion in a liquid having high hydrophilicity for a long period of time. As the "liquid having high hydrophilicity", there may be given pigment ink and the like. For example, it is appropriate that a face material be soaked in pigment ink to be used for 10 minutes or more.

As the method of providing a hydrophilic film to a face surface, there may be given a method of forming a metal film or a hydrophilic resin film on a face surface. Needless to say, the hydrophilic film has hydrophilicity, and the hydrophilic film is preferably formed of a material having satisfactory adhesiveness with respect to a face material. As such material, there may be given a composition containing a water-soluble resin and a water-insoluble low molecular weight compound. For example, the hydrophilic film can be formed by dissolving a water-soluble resin (hydroxypropyl cellulose, etc.) and a water-insoluble low molecular weight compound (bisphenol A, etc.) in an appropriate solvent (dimethylformamide, etc.), applying the obtained solution to a face surface, drying the solution, and treating the dried solution with alcohol or the like as needed.

It is appropriate that the method of forming a hydrophilic region be selected from among the above-mentioned methods as appropriate depending on the material forming a face material. Further, the hydrophilic region may be formed by a combination of two or more kinds of the above-mentioned methods. Of the above-mentioned methods, preferred is a method of forming a nozzle peripheral portion of an epoxy-based photosensitive resin, treating the nozzle peripheral portion with $UV/O_3$, and subjecting the nozzle peripheral portion to hydrophilic treatment by soaking the nozzle peripheral portion in pigment ink.

In addition, for example, when an ink whose coloring material is a dye and whose surface tension is more than 34 mN/m is used, a recording head (water-repellent head) in which a water-repellent region is formed on the peripheral edge of an ink ejection orifice is preferred. In addition, a water-repellent region having a contact angle with the ink to be used of 90° or more is more preferably formed on the peripheral edge of the ink ejection orifice, and a water-repellent region having a contact angle with the ink of 100° or more is particularly preferably formed.

The water-repellent region can be formed by, for example, a method of providing a water-repellent film on the surface (face surface) of a member (face material) in which an ink ejection orifice is formed.

The method of providing the water-repellent film to the face surface can be, for example, a method of forming an ultra-water-repellent resin film on the face surface. The ultra-water-repellent resin film can be formed by a conventionally known method. Examples thereof may include: a method of applying a fluorine resin, a silicone resin, or the like to the face surface to form a resin film; and a method of subjecting a fluorine-based monomer to plasma polymerization on the face surface to form a fluorine resin film. A method of forming a water/oil-repellent resin film on the face surface may also be adopted. An example of the method may be a method of forming a film formed of a fluorine resin obtained by polymerizing a fluorocarbon compound. In particular, the following method is preferred: a solution is prepared by dissolving a fluorine-containing silicone coupling agent (such as "KP-801M" manufactured by Shin-Etsu Chemical Co., Ltd.) in a fluorine-based solvent (such as "CXT-809A" manufactured by ASAHI GLASS CO., LTD., or "<Novec> HFE-7100," "<Novec> HFE-7200," or "<Novec> HFE-71IPA" manufactured by Sumitomo 3M Limited), and the solution is deposited from the vapor onto the face surface under heat to form a water-repellent film.

(1-4) Entire Structure of Recording Head

Figure 2A:
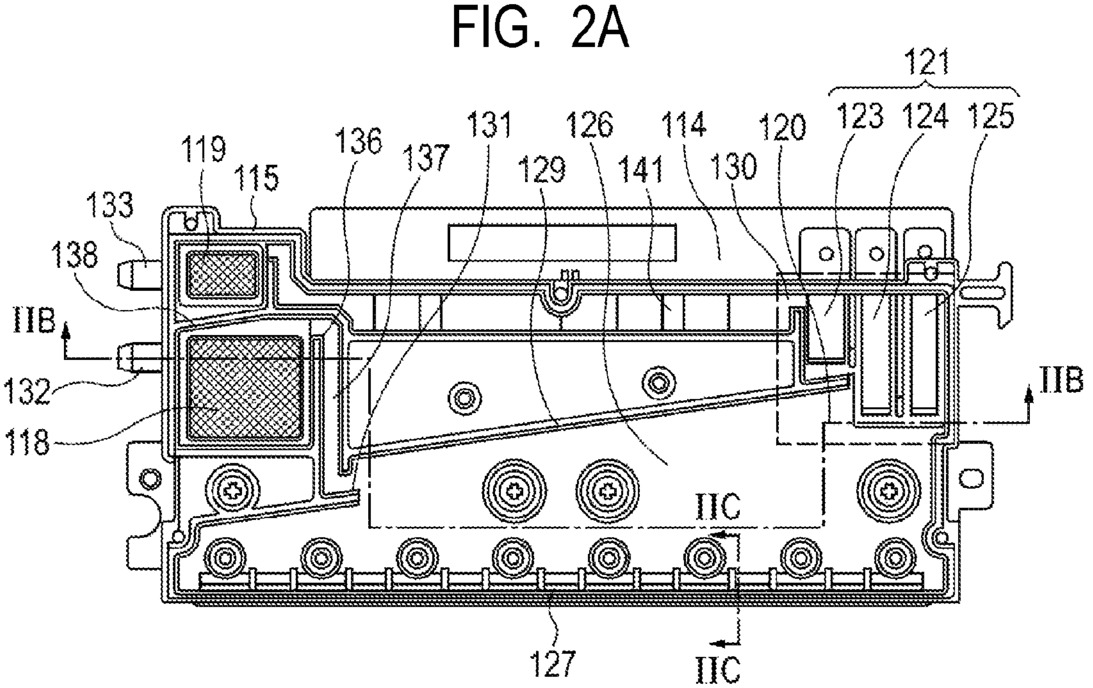
FIG. 2A is a front view schematically illustrating a recording head according to the present invention.
Figure 2B:
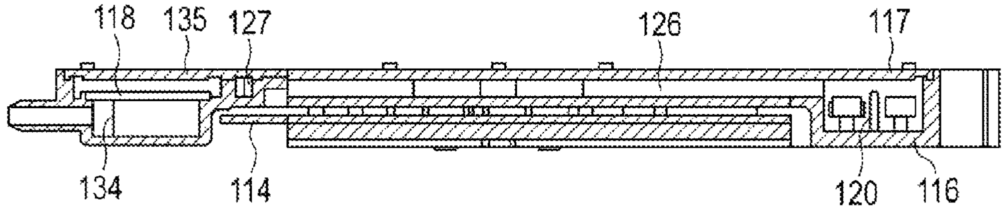
FIG. 2B is a sectional view illustrating the recording head taken along the line IIB-IIB of FIG. 2A.
Figure 2C:
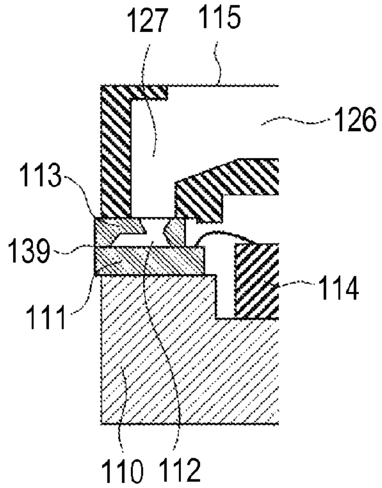
FIG. 2C is a sectional view illustrating the recording head taken along the line IIC-IIC of FIG. 2A.

Next, an entire structure of the recording head will be described with reference to FIG. 2A to FIG. 2C. The recording head having a structure as illustrated in FIG. 2A to FIG. 2C is disclosed in Japanese Patent Application Laid-Open No. 2013-014111. Therefore, the disclosure of Japanese Patent Application Laid-Open No. 2013-014111 is incorporated herein by reference in its entirety and only a brief description thereof will be provided. FIG. 2A is a front view schematically illustrating the recording head according to the present invention. FIG. 2B is a sectional view taken along the line IIB-IIB of FIG. 2A. FIG. 2C is a sectional view taken along the line IIC-IIC of FIG. 2A. For the sake of convenience of description, a liquid supply case cover is omitted in the front view.

As illustrated in FIG. 2A to FIG. 2C, it is preferred that the recording head according to the present invention being a line type head include the common liquid chamber 112 communicating with the plurality of nozzle flow paths which form the nozzle array, a liquid supply port 127 communicating with the common liquid chamber 112, a main liquid supply chamber 126 communicating with the liquid supply port 127, a liquid supply path 137 communicating with the main liquid supply chamber 126, a liquid supply chamber (first liquid supply chamber 134 and second liquid supply chamber 135) communicating with the liquid supply path 137, a supply filter 118 provided so as to partition the liquid supply chamber into the first liquid supply chamber 134 and the second liquid supply chamber 135 from an upstream side along a flow during liquid supply, a gas-liquid separation portion 120 provided in a part of the main liquid supply chamber 126, and an air chamber 141 communicating with the gas-liquid separation portion 120.

Further, it is preferred that the nozzle flow paths, the common liquid chamber 112, the liquid supply port 127, the main liquid supply chamber 126, the liquid supply path 137, the liquid supply chamber (the first liquid supply chamber 134 and the second liquid supply chamber 135), the supply filter 118, the gas-liquid separation portion 120, and the air chamber 141 be disposed on a plane parallel to a plane including an arrangement direction of the nozzle flow paths and an ejection direction of the liquid, and the main liquid supply chamber 126, the liquid supply path 137, the supply filter 118, the gas-liquid separation portion 120, and the air chamber 141 be disposed without being stacked on top of each other.

The recording head having the structure as illustrated in FIG. 2A to FIG. 2C is referred to as a recording head of a gas-liquid separation type. The recording head of the gas-liquid separation type fills a nozzle thereof with ink under the ink's own weight, and thus, it is extremely difficult to secure the stability of ejection compared with a recording head of the conventional structure. Therefore, it can be said that the recording head of the gas-liquid separation type is an embodiment which can most enjoy the effects of the present invention.

A base plate 110 made of ceramic supports the heater substrate 111 made of silicon. On the heater substrate 111, a plurality of electricity-heat converters (heaters or energy generation portions) serving as ejection energy generation elements for a liquid and a plurality of flow path walls configured to form nozzles corresponding to the electricity-heat converters are formed. Further, a liquid chamber frame surrounding the common liquid chamber 112 communicating with each nozzle is also formed on the heater substrate 111. The top board member 113 forming the common liquid chamber 112 is joined onto a side wall of the nozzle and the liquid chamber frame thus formed. Thus, the heater substrate 111 and the top board member 113, which are integrated with each other, are stacked on and bonded to the base plate 110. Such stacking and bonding are performed by an adhesive having a satisfactory heat conductivity such as silver paste. In a back portion of the heater substrate 111 on the base plate 110, a mounted printed circuit board (PCB) 114 is supported by a double-sided tape (not shown). Each ejection energy generation element on the heater substrate 111 and the PCB 114 are electrically connected to each other by wire bonding corresponding to each wiring.

A liquid supply member 115 is joined onto an upper surface of the top board member 113. The liquid supply member 115 is formed of a liquid supply case 116 and a liquid supply case cover 117. When the liquid supply case cover 117 closes the upper surface of the liquid supply case 116, a liquid chamber and a liquid supply path to be described later are formed. The liquid supply case 116 and the liquid supply case cover 117 are joined to each other by, for example, a thermosetting adhesive. Further, the liquid supply case 116 is provided with the supply filter 118 and a discharge filter 119. The supply filter 118 serves to remove foreign matters in a liquid supplied to the liquid supply member 115, and the discharge filter 119 serves to prevent foreign matters from entering from outside of the recording head. Each filter is fixed to the liquid supply case 116 by thermal welding. Further, the gas-liquid separation portion 120 is formed in a part of the liquid supply case 116, and a liquid surface detection sensor 121 is mounted from outside so as to protrude into the gas-liquid separation portion 120. Thus, the amount of a liquid in the liquid chamber is controlled as described above.

Now, the structure of the liquid chamber, the liquid supply path, and the like formed by fitting of two components: the liquid supply case 116 and the liquid supply case cover 117 will be described. In a joining surface of the liquid supply case 116 with respect to the top board member 113, the liquid supply port 127 being a rectangular opening portion is formed substantially in parallel to an arrangement direction of nozzles over the width of the nozzle array, and the main liquid supply chamber 126 in a reservoir chamber shape is formed in an extended portion of the liquid supply port 127. That is, the main liquid supply chamber 126 is formed substantially in parallel to the nozzle array over the width of the nozzle array. Further, a top surface on an opposed side of the liquid supply port 127 forms an inclination with the gas-liquid separation portion 120 being an uppermost portion (main liquid supply chamber inclination 129) substantially over the entire region. The main liquid supply chamber inclination 129 has two opening portions, one of which is a liquid communication portion 131 and the other of which is the gas-liquid separation portion 120.

The gas-liquid separation portion 120 is formed as a part of the main liquid supply chamber 126, and the depth of the part formed of the gas-liquid separation portion 120 is larger than that of the other part of the main liquid supply chamber 126. The purpose of this structure is to enhance the effect of breaking air bubbles mixed in a liquid in the liquid chamber as described later. In the ink jet head illustrated in FIG. 2A to FIG. 2C, three electrodes of stainless steel are mounted in the gas-liquid separation portion 120, and the electrodes are an upper limit detection electrode 123, a ground electrode 124, and a lower limit detection electrode 125 arranged in the order from the left side of FIG. 2A. The liquid surface in the main liquid supply chamber 126 is kept between the upper limit and the lower limit by the electric conduction between the ground electrode 124 and the upper limit detection electrode 123 and the electric conduction between the ground electrode 124 and the lower limit detection electrode 125. In the ink jet head illustrated in FIG. 2A to FIG. 2C, the reliability of detection can be enhanced by detecting the liquid surface of a liquid subjected to gas-liquid separation.

An air communication portion 130 is disposed on an extended portion of the gas-liquid separation portion 120, and the air chamber 141 serving as an air flow path is formed in a further extended portion. The discharge filter 119 described above is provided in a still further extended portion and communicates with a discharge joint 133. The discharge filter 119 is formed of a material having water repellency. Even when a liquid flows into the air flow path (air chamber 141) and ink adheres to the discharge filter 119 to form a meniscus of the ink in the discharge filter 119, the capillary force of a filter portion can be reduced by the water repellency and the ink can be removed easily.

On the other hand, the liquid supply path 137 is provided through intermediation of the liquid communication portion 131 provided at the main liquid supply chamber inclination 129. The liquid supply path 137 forms a tubular shape from the liquid communication portion 131 to the vicinity of the supply filter 118 and is formed on a plane that is substantially identical and parallel to that of the main liquid supply chamber 126. The supply filter 118 is also disposed on a plane that is substantially identical and parallel to that of the main liquid supply chamber 126. The supply filter 118 is provided so as to partition the liquid supply chamber into two chambers. The chamber on a side communicating with a supply joint 132, that is, the chamber on an upstream side along a flow of liquid supply in the recording head is defined as the first liquid supply chamber 134, and the chamber on a downstream side is defined as the second liquid supply chamber 135. The supply filter 118 is disposed on a plane that is substantially identical and parallel to that of the main liquid supply chamber 126, and hence the first liquid supply chamber 134 and the second liquid supply chamber 135 adjacent to both surfaces of the supply filter 118 are also disposed on a plane that is substantially parallel to that of the main liquid supply chamber 126 and an ink ejection orifice arrangement surface 139.

The second liquid supply chamber 135 has an opening (hereinafter referred to as "second liquid supply chamber opening 136") above the supply filter 118 and communicates with the liquid supply path 137 through the second liquid supply chamber opening 136. Further, a top surface of the second liquid supply chamber 135 is provided with an inclination (hereinafter referred to as "second liquid supply chamber inclination 138") with the second liquid supply chamber opening 136 being an uppermost portion.

As described above, the main liquid supply chamber 126, the gas-liquid separation portion 120, the liquid supply path 137, the supply filter 118, the first liquid supply chamber 134, and the second liquid supply chamber 135 are each provided on a plane that is substantially parallel to the ink ejection orifice arrangement surface 139. On the other hand, as illustrated in FIG. 2B, it is important that the main liquid supply chamber 126, the liquid supply path 137, the supply filter 118, and the gas-liquid separation portion 120 be disposed so as not to overlap each other in a direction perpendicular to the plane.

It is preferred that the supply filter 118 be a mesh made of stainless steel having a filter pore diameter of 1 μm or more and 10 μm or less and a filter area of 10 $mm^2$ or more and 500 $mm^2$ or less. The supply filter 118 having a filter pore diameter of 1 μm or more and a filter area of 10 $mm^2$ or more can reduce a flow path resistance (pressure loss) and can facilitate movement of an air bubble in the recording head. In order to obtain the above-mentioned effects with more reliability, it is further preferred that the filter area be 200 $mm^2$ or more. On the other hand, the supply filter 118 having a filter pore diameter of 10 μm or less can prevent dust from flowing into the nozzle without fail, and the supply filter 118 having a filter area of 500 $mm^2$ or less can downsize the recording head. In order to obtain the above-mentioned effects with more reliability, it is further preferred that the filter pore diameter be 3 μm or more and 8 μm or less.

(1-5) Filling of Ink

In the recording head according to the present invention, the internal space of the line type head, which communicates with the ink ejection orifices, is filled with ink for ink jet recording. It is preferred that at least a portion of the internal space from ink ejection orifices to the common liquid chamber (that is, the nozzle flow paths and the common liquid chamber) is filled with the ink.

(1-6) Ink

In the recording head of the present invention, an internal space which communicates with the ink ejection orifice is filled with an ink for ink jet recording. The ink contains a coloring material, an acetylene glycol-based surfactant, and water as essential components, and may contain a water-soluble compound or any other additive as required. Each component will be described below.

(1-6-1) Surfactant

The ink contains the acetylene glycol-based surfactant as a surfactant. Examples of the acetylene glycol-based surfactant can include an acetylene glycol (such as 2,4,7,9-tetramethyl-5-decyne-4,7-diol) and an acetylene alcohol (such as 3,5-dimethyl-1-hexyne-3-ol), and alkylene oxide adducts thereof. However, the ink contains one or two or more kinds of acetylene glycols or ethylene oxide adducts thereof as the acetylene glycol-based surfactant, and the average addition number of moles of ethylene oxide of the entirety thereof is 3 or more and 7 or less. Adopting such construction can improve the stability of ejection of the ink.

As long as the conditions are satisfied, a specific chemical structure is not particularly limited. For example, a compound (1) represented by the following general formula (1) (2,4,7,9-tetramethyl-5-decyne-4,7-diol or an ethylene oxide adduct thereof) can be used.

General formula (1)

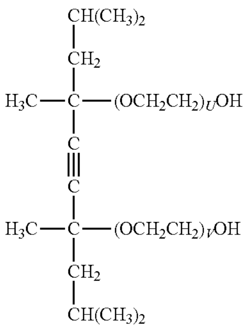

(In the formula, U and V each represent the addition number of moles of ethylene oxide.)

The term "addition number of moles of ethylene oxide" refers to the average number of moles of ethylene oxide added per molecule of acetylene glycol. When description is made by taking the compound (1) as an example, the term means the average of U+V. In the present invention, the ink contains one or two or more kinds of acetylene glycols or ethylene oxide adducts thereof, and the U+V of the entirety thereof needs to be 3 or more and 7 or less, and is preferably 4 or more and 6 or less. In the case where the addition number of moles of ethylene oxide of the entirety of one or two or more kinds of the compounds (1) is 3 or more, the compounds have some degree of hydrophilicity as a whole, and hence the surface tension of the ink can be increased and the stability of ejection of the ink can be improved. On the other hand, the case where the addition number of moles of ethylene oxide of the entirety of one or two or more kinds of the compounds (1) is less than 3 is not preferred because the compounds have low solubility in the ink as a whole. In the case where the addition number of moles of ethylene oxide of the entirety of one or two or more kinds of the compounds (1) is 7 or less, the compounds maintain some degree of hydrophobicity as a whole, and hence the wettability of the ink with respect to a nozzle wall constituted of, for example, an epoxy-based photosensitive resin can be improved. Therefore, the performance by which the ink is supplied to a nozzle improves and the stability of ejection of the ink improves.

Examples of the compound (1) having an average of U+V is 3 or more and 7 or less include commercial products such as: "Acetylenol E40" (having an average of U+V of 4) and "Acetylenol E60" (having an average of U+V of 6) manufactured by Kawaken Fine Chemicals Co., Ltd.; and "Surfynol 440" (having an average of U+V of 4) manufactured by Air Products and Chemicals, Inc. Of those commercial products, for example, "Acetylenol E40" having an average of U+V of 4 and "Acetylenol E60" having an average of U+V of 6 are preferred.

The ink may contain two or more kinds of acetylene glycols or ethylene oxide adducts thereof. That is, two or more kinds of the compounds (1) having different averages of U+V may be mixed to adjust the average of the U+V of the entirety of one or two or more kinds of the compounds. For example, the compound (1) having an average of U+V of 6 and the compound (1) having an average of U+V of 8 can be mixed at a mass ratio of 1:1 to set the average of the U+V of the entire mixture to 7. In such method, a commercial product serving as the compound (1) having an average of U+V of less than 3 or more than 7 can also be used. Examples thereof include: "Acetylenol E00" (having an average of U+V of 0), "Acetylenol E81" (having an average of U+V of 8), and "Acetylenol E100" (having an average of U+V of 10) manufactured by Kawaken Fine Chemicals Co., Ltd.; and "Surfynol 420" (having an average of U+V of 2) manufactured by Air Products and Chemicals, Inc.

When the coloring material is a dye, the acetylene glycol-based surfactant is preferably incorporated at a content of 0.3 mass % or less with respect to the entirety of the ink. When the coloring material is a pigment, the surfactant is preferably incorporated at a content of 1.5 mass % or less, and is more preferably incorporated at a content of 1.0 mass % or less with respect to the entirety of the ink. Setting the content as described above provides the ink with an appropriate surface tension and hence improves the stability of ejection of the ink. A lower limit for the content of the acetylene glycol-based surfactant is not particularly limited. However, irrespective of whether the coloring material is a dye or a pigment, the acetylene glycol-based surfactant is preferably incorporated at a content of 0.1 mass % or more with respect to the entirety of the ink in order that an effect of adding the surfactant may be obtained.

(1-6-2) Coloring Material

The ink contains the coloring material. The coloring material comprehends a pigment and a dye. The pigment may be any one of an inorganic pigment and an organic pigment, and may be a resin-dispersed pigment or self-dispersed pigment subjected to surface modification by an ordinary method. It should be noted that not only a conventionally known pigment or dye to be described later but also a newly synthesized or produced pigment or dye can be used as the pigment or the dye.

(1-6-2A) Pigment

Examples of the pigment to be used in the ink include carbon black and an organic pigment. One kind of various pigments may be used, or two or more kinds thereof may be used in combination.

Specific examples of the carbon black may include carbon black pigments such as furnace black, lamp black, acetylene black, and channel black. There may be used, for example, a carbon black pigment having a brand name such as Raven (manufactured by Aditya Birla), Black Pearls L, Regal, Mogul L, Monarch, or Valcan (manufactured by Cabot Corporation), Color Black, Printex, or Special Black (manufactured by Degussa), or Mitsubishi Carbon Black (manufactured by Mitsubishi Chemical Corporation) as a trade name. It should be appreciated that the carbon black is not limited thereto, and conventionally known carbon black may also be used. In terms of physical properties, carbon black having a primary particle diameter of 10 nm or more and 40 nm or less, a specific surface area based on a BET method of from 50 to 400 $m^2/g$ or less, an absorbed amount of from 40 to 200 ml/100 g or less, a volatile content of from 0.5 to 10%, and a pH of from 2 to 9 is suitable for obtaining the effects of the present invention. Note that, the absorbed amount means a DBP value measured by JIS K 6221 A method.

Specific examples of the organic pigment may include: insoluble azo pigments such as toluidine red, toluidine maroon, hansa yellow, benzidine yellow, and pyrazolone red; soluble azo pigments such as lithol red, helio bordeaux, pigment scarlet, and permanent red 2B; derivatives of a vat dye such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; thioindigo-based pigments; condensed azo-based pigments; and other pigments such as flavanthrone yellow, acylamide yellow, quinophthalone yellow, nickel azo yellow, copper azomethine yellow, perinone orange, anthrone orange, dianthraquinonyl red, and dioxazine violet.

In addition, examples of the organic pigment indicated by a color index (C.I.) number may include the following pigments. It should be understood that in addition to the following, a conventionally known organic pigment may be used.

C.I. Pigment Yellow: 12, 13, 14, 17, 20, 24, 74, 83, 86, 93, 109, 110, 117, 120, 125, 128, 137, 138, 147, 148, 151, 153, 154, 166, and 168

C.I. Pigment Orange: 16, 36, 43, 51, 55, 59, and 61

C.I. Pigment Red: 9, 48, 49, 52, 53, 57, 97, 122, 123, 149, 168, 175, 176, 177, 180, 192, 215, 216, 217, 220, 223, 224, 226, 227, 228, 238, and 240

C.I. Pigment Violet: 19, 23, 29, 30, 37, 40, and 50

C.I. Pigment Blue: 15, 15:1, 15:3, 15:4, 15:6, 22, 60, and 64

C.I. Pigment Green: 7 and 36

C.I. Pigment Brown: 23, 25, and 26

(1-6-2B) Dye

The molecular structure and the like of the dye are not particularly limited. However, a water-soluble dye is preferably used. For example, a black dye, yellow dye, magenta dye, or cyan dye listed below can be suitably used.

Examples of the black dye may include:

(1) acid dyes such as C.I. Acid Black 2, 48, 51, 52, 110, 115, and 156;

(2) direct dyes such as C.I. Direct Black 17, 19, 22, 31, 32, 51, 62, 71, 74, 112, 113, 154, and 168;

(3) reactive dyes such as C.I. Reactive Black 1, 8, 12, and 13; and (4) edible dyes such as C.I. Food Black 1 and 2.

Examples of the yellow dye may include:

(1) acid dyes such as C.I. Acid Yellow 11, 17, 23, 25, 29, 42, 49, 61, and 71; and (2) direct dyes such as C.I. Direct Yellow 12, 24, 26, 44, 86, 87, 98, 100, 130, and 142.

Examples of the magenta dye may include:

(1) acid dyes such as C.I. Acid Red 1, 6, 8, 32, 35, 37, 51, 52, 80, 85, 87, 92, 94, 115, 180, 254, 256, 289, 315, and 317; and (2) direct dyes such as C.I. Direct Red 1, 4, 13, 17, 23, 28, 31, 62, 79, 81, 83, 89, 227, 240, 242, and 243.

Examples of the cyan dye may include:

(1) acid dyes such as C.I. Acid Blue 9, 22, 40, 59, 93, 102, 104, 113, 117, 120, 167, 229, 234, and 254; and (2) direct dyes such as C.I. Direct Blue 6, 22, 25, 71, 78, 86, 90, 106, and 199.

In addition to those dyes, a dye disclosed in Japanese Patent Application Laid-Open No. 2011-140636, Japanese Patent Application Laid-Open No. 2006-143989, Japanese Patent Application Laid-Open No. H06-25573, EP 0468647 A1, EP 0468648 A1, EP 0468649 A1, or the like can also be used.

The content of the coloring material is not particularly limited, and has only to be appropriately determined depending on, for example, the kind of the coloring material, the kind of a solvent, and characteristics which the ink is required to have. However, the coloring material is preferably incorporated at a content of 0.5 mass % or more and 10 mass % or less with respect to the entirety of the ink. Setting the content to 0.5 mass % or more can provide an image having a sufficient optical density. Meanwhile, setting the content to 10 mass % or less can suppress the sticking of the ink to a nozzle or the like, and hence can improve the stability of ejection of the ink through a reduction in viscosity. In order that the effects may be obtained with additional reliability, the coloring material is more preferably incorporated at a content of 1 mass % or more and 8 mass % or less, and is particularly preferably incorporated at a content of 1.5 mass % or more and 6 mass % or less with respect to the entirety of the ink.

(1-6-3) Water

The ink is an aqueous ink, and uses water as a medium. Deionized water (ion-exchanged water) is preferably used as the water. Although the content of the water is not particularly limited, the content is preferably 30 mass % or more and 90 mass % or less, more preferably 40 mass % or more and 85 mass % or less, particularly preferably 50 mass % or more and 80 mass % or less with respect to the entirety of the ink.

(1-6-4) Water-Soluble Compound

The ink contains a water-soluble compound in addition to the water. The term "water-soluble compound" as used herein refers to at least one kind selected from the group consisting of a water-soluble organic solvent and a water-soluble compound that is solid at 25° C. That is, the ink uses an aqueous medium containing the water and the water-soluble compound as a medium. The incorporation of the water-soluble compound can prevent the evaporation of the water and hence can prevent the sticking of the ink due to drying.

The kind of the water-soluble compound is not particularly limited. For example, various water-soluble organic solvents including such alcohols, polyhydric alcohols, glycol ethers, carboxylic acid amides, heterocycles, ketones, and alkanolamines as listed below can each be used. A water-soluble compound that is solid at 25° C. such as urea, ethylene urea, or trimethylolpropane can also be used.

(1) Alcohol

A linear alcohol having 1 to 5 carbon atoms such as methanol, ethanol, n-propyl alcohol, isopropyl alcohol, n-butyl alcohol, sec-butyl alcohol, isobutyl alcohol, tert-butyl alcohol, or n-pentyl alcohol.

(2) Polyhydric Alcohol

An alkanediol such as ethylene glycol (ethanediol), propanediol (1,2- or 1,3-propanediol), butanediol (1,2-, 1,3-, or 1,4-butanediol), 1,5-pentanediol, or 1,2-hexanediol.

A condensed product of an alkanediol such as diethylene glycol, triethylene glycol, tetraethylene glycol, dipropylene glycol, tripropylene glycol, polyethylene glycol, or polypropylene glycol.

A polyhydric alcohol other than an alkanediol such as glycerin, trimethylolpropane, 1,2,6-hexanetriol, or thiodiglycol.

(3) Glycol Ether

A monomethyl ether of ethylene glycol.

A monomethyl ether or monoethyl ether of diethylene glycol.

A monomethyl ether, monoethyl ether, monobutyl ether, dimethyl ether, or diethyl ether of triethylene glycol.

A dimethyl ether or diethyl ether of tetraethylene glycol.

(4) Carboxylic Acid Amide

N,N-Dimethylformamide or N,N-dimethylacetamide.

(5) Heterocycle

A cyclic ether such as tetrahydrofuran or dioxane.

A nitrogen-containing heterocycle such as 2-pyrrolidone, N-methyl-2-pyrrolidone, or N-methyl morpholine.

A sulfur-containing heterocycle such as sulfolane.

(6) Urea

A urea such as urea, ethyleneurea, or 1,3-dimethyl-2-imidazolidinone (N,N'-dimethylethyleneurea).

(7) Ketone

A ketone such as acetone or methyl ethyl ketone.

A ketoalcohol such as 4-hydroxy-4-methyl-2-pentanone (diacetone alcohol).

(8) Alkanolamine

A monoethanolamine, diethanolamine, or triethanolamine.

(9) Other

A sulfur-containing compound such as dimethyl sulfoxide or bis(hydroxyethyl)sulfone.

Of the water-soluble organic solvents, polyhydric alcohols are preferred and glycerin is more preferred. Glycerin is preferred because glycerin hardly volatilizes and exhibits an excellent preventing effect on the sticking of an ink. In addition, one kind of the water-soluble organic solvents may be used alone, or two or more kinds thereof may be used as a mixture. For example, glycerin, and a polyhydric alcohol except glycerin and a nitrogen-containing heterocycle are preferably used in combination. At this time, triethylene glycol or the like can be used as the polyhydric alcohol except glycerin and 2-pyrrolidone or the like can be used as the nitrogen-containing heterocycle. Such mixed solvent is preferred because the mixed solvent exhibits a high preventing effect on the thickening of the ink.

The content of the water-soluble compound is not particularly limited. However, the content is set to preferably 10 mass % or more, more preferably 15 mass % or more with respect to the entirety of the ink in order that preventing effects on the evaporation of the aqueous medium and on the sticking of the ink due to drying may be obtained. Meanwhile, the content is set to preferably 40 mass % or less, more preferably 30 mass % or less with respect to the entirety of the ink from the viewpoints of allowing the ink to correspond to a high drive frequency and preventing the occurrence of mildew.

Urea, ethylene urea, or the like is preferably used as the water-soluble compound that is solid at 25° C., and ethylene urea is more preferably used as the compound. The content of the water-soluble compound that is solid at 25° C. is not particularly limited. However, the content is set to preferably 5 mass % or more, more preferably 9 mass % or more with respect to the entirety of the ink in order that preventing effects on the evaporation of the aqueous medium and on the thickening of the ink due to drying may be obtained. Meanwhile, the content is set to preferably 40 mass % or less, more preferably 30 mass % or less with respect to the entirety of the ink for preventing inconvenience due to excessive addition.

(1-6-5) Other Additive

The ink may contain an additive other than the surfactant depending purposes. Examples of such additive may include a pH adjustor, a rust inhibitor, an antiseptic, a mildew proofing agent, an antioxidant, a reduction inhibitor, and a salt.

(1-6-6) Viscosity

The viscosity of the ink is 1.5 mPa·s or more and 5.0 mPa·s or less. Setting the viscosity to 1.5 mPa·s or more can result in the formation of a good ink droplet. Meanwhile, setting the viscosity to 5.0 mPa·s or less improves the flowability of the ink, and hence improves the property by which the ink is supplied to a nozzle, and by extension, the stability of ejection of the ink. In order that the effects may be exhibited with additional reliability, the viscosity is preferably set to 1.7 mPa·s or more and 3.0 mPa·s or less.

The viscosity of the ink means a value measured with an E-type viscometer (for example, "RE-80L viscometer" manufactured by Toki Sangyo Co., Ltd.) under the condition of a temperature of 25° C. according to JIS Z 8803. The viscosity of the ink can be adjusted by, for example, the kind and amount of the surfactant and the kind and amount of the water-soluble organic solvent.

(2) Ink Jet Recording Apparatus

The ink jet recording apparatus according to the present invention includes a recording head for ink jet recording and an ink storage portion configured to store ink to be supplied to the recording head, and has a feature in that the recording head is the recording head according to the present invention. The form of the ink storage portion is not particularly limited. For example, the ink storage portion may be an ink tank as illustrated in FIG. 3.

(2-1) Ink Tank

Figure 3:
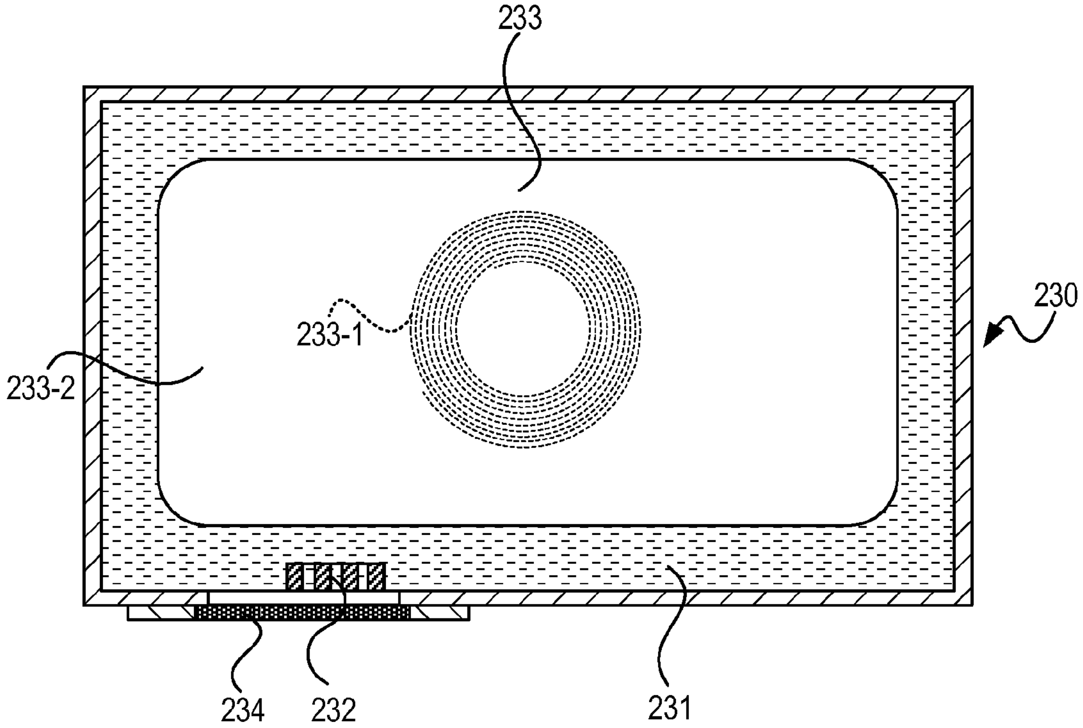
FIG. 3 is an enlarged sectional view illustrating an ink tank.

FIG. 3 is an enlarged sectional view illustrating the ink tank. An ink tank 230 is a container configured to store liquid, and a liquid chamber (ink chamber 231) configured to store ink is formed therein. The ink chamber 231 has closed space formed therein, which can communicate with the outside only via a joint portion 232. The ink tank 230 is formed so as to be removable from the recording head. Further, the ink tank 230 is provided above the recording head. The ink chamber 231 is formed of a flexible member, and has built therein a spring 233-1 configured to generate negative pressure and a pressure plate 233-2 coupled to the spring 233-1. The spring 233-1 urges the ink chamber 231 via the pressure plate 233-2 from the inside to the outside to enlarge internal space of the ink chamber 231. In other words, the spring 233-1 generates predetermined negative pressure in the ink chamber 231, and the spring 233-1, the pressure plate 233-2, and the ink chamber 231 are integral with one another to form a negative pressure generation portion 233. The joint portion 232 is provided with a filter 234 made of a nonwoven fabric.

Figure 4:
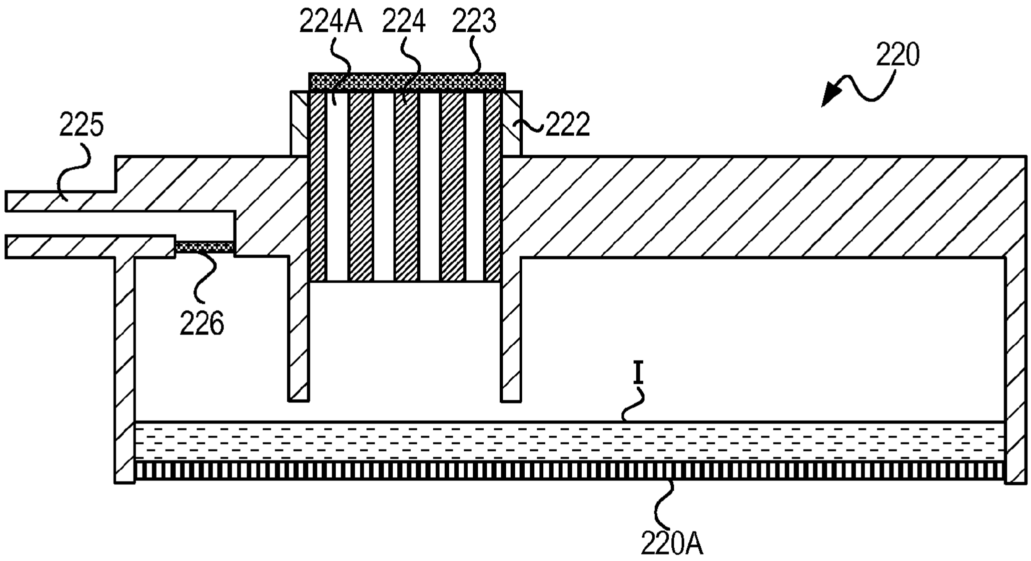
FIG. 4 is an enlarged sectional view of the recording head.

FIG. 4 is an enlarged sectional view of the recording head. A recording head 220 includes an energy generation element (not shown) such as an electricity-heat conversion element (heater for ink ejection). The energy generation element causes ink I in an ink chamber 221 (liquid in the liquid chamber) to be ejected from an ejection orifice 220A. In the ink chamber 221, air (gas) exists together with the ink I. Therefore, an ink storage portion (liquid storage portion) having the ink I stored therein and an air storage portion (gas storage portion) having air (gas) stored therein are formed in the ink chamber 221.

An ink supply portion 222 for communicating the ink chamber 221 with the ink chamber 231 of the ink tank is provided above the ink chamber 221. An average width of the ink supply portion 222 is about 10 mm. Further, a filter member 223 is provided in an opening portion of the ink supply portion 222. The filter member 223 illustrated in FIG. 4 is a mesh formed of SUS. Metal fibers are woven into the mesh. A fine mesh of the filter member 223 suppresses entry of dust into the recording head from the outside.

Figure 5A:
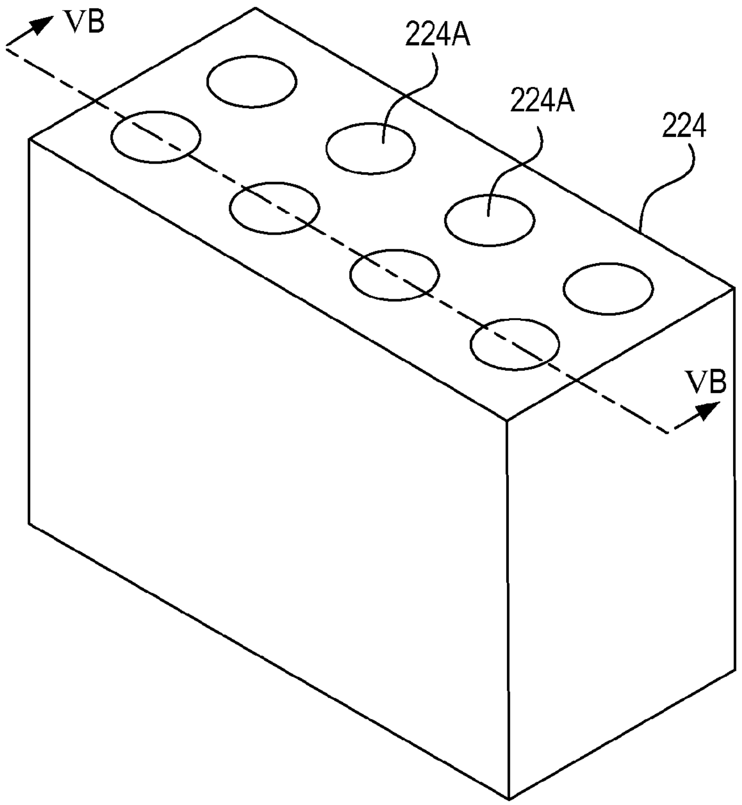
FIG. 5A is an enlarged perspective view illustrating an ink retaining member illustrated in FIG. 4.
Figure 5B:
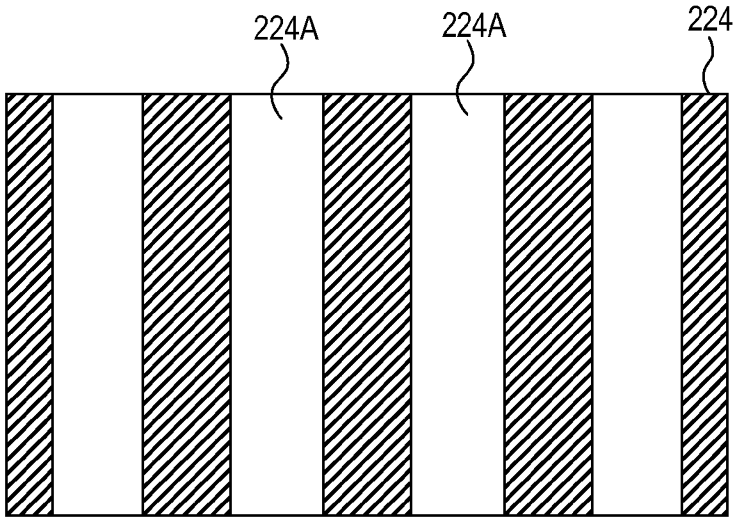
FIG. 5B is a sectional view illustrating the ink retaining member taken along the line VB-VB of FIG. 5A.

A lower surface of the filter member 223 is in press contact with an ink retaining member 224 capable of retaining ink therein. FIG. 5A is an enlarged perspective view of the ink retaining member illustrated in FIG. 4. FIG. 5B is a sectional view illustrating the ink retaining member taken along the line VB-VB of FIG. 5A. As illustrated in FIG. 5A and FIG. 5B, a plurality of flow paths 224A that are circular in cross-section are formed in the ink retaining member 224. Each of the flow paths 224A has a diameter of about 1.0 mm.

Further, as illustrated in FIG. 4, an opening portion 225 is provided in an upper portion of the ink chamber 221. A filter 226 is provided in the opening portion 225. The opening portion 225 is configured to be coupled to a transportation portion (not shown) that is an outside flow path. The transportation portion is a flow path through which liquid and/or gas can be transported. The opening portion 225 is configured to cause the ink I and/or gas in the ink chamber 221 to flow to the outside, or, to cause liquid (such as ink) and/or gas outside the recording head 220 to flow into the ink chamber 221. In other words, the opening portion 225 is configured not only to cause liquid to solely flow out or flow in but also to cause gas to flow out or flow in together with the liquid.

By coupling the joint portion 232 of the ink tank 230 illustrated in FIG. 3 to the ink supply portion 222 of the recording head 220 illustrated in FIG. 4, the ink tank 230 illustrated in FIG. 3 is directly connected to the recording head 220 illustrated in FIG. 4. At this time, the filter 234 of the ink tank 230 illustrated in FIG. 3 and the filter member 223 of the recording head 220 illustrated in FIG. 4 are in press contact with each other in a vertical direction. The coupled portion between the ink tank and the recording head formed in this way can maintain airtightness thereof by being surrounded by an elastic cap member formed of rubber. The above-mentioned structure in which the recording head and the ink tank are directly connected with each other is preferred in that an ink supply path (liquid supply path) therebetween can be extremely short.

(2-2) Entire Structure of Recording Apparatus

Structures and the like of other portions of the ink jet recording apparatus are not particularly limited. For example, a recording apparatus 300 illustrated in FIG. 6 can be suitably used.

Figure 6:
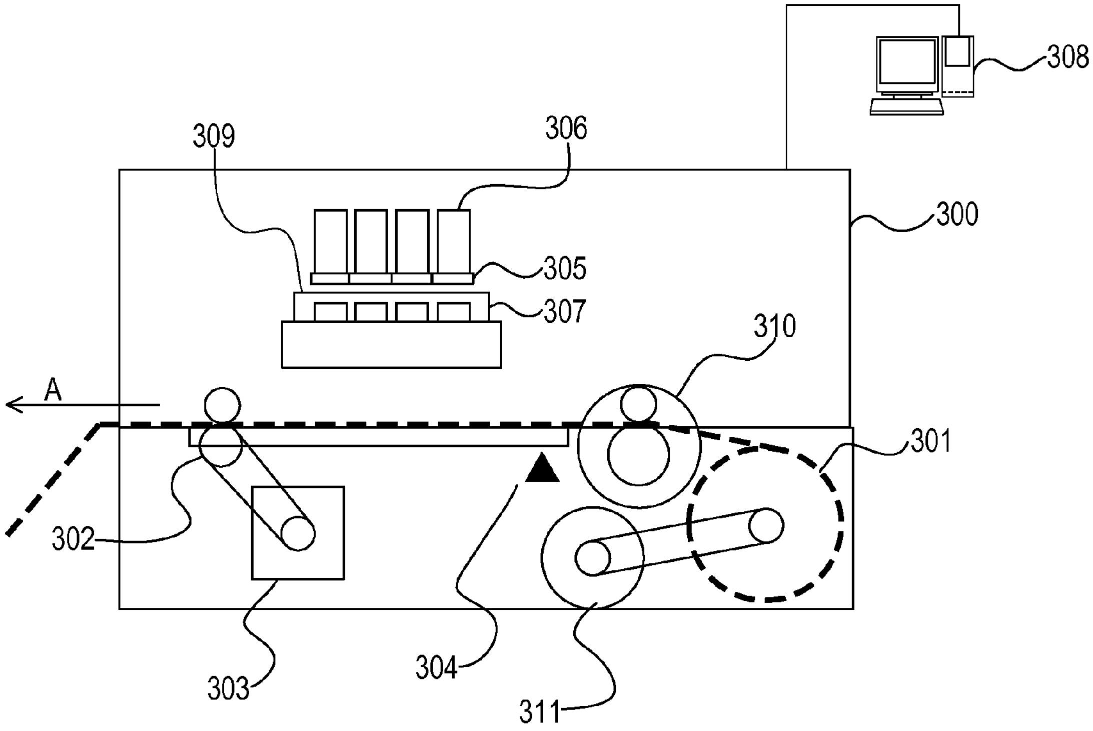
FIG. 6 is a schematic structural view schematically illustrating an entire structure of an ink jet recording apparatus.

FIG. 6 is a schematic structural view schematically illustrating an entire structure of the ink jet recording apparatus. An outside host apparatus (computer apparatus 308) is connected to the recording apparatus 300. The recording apparatus 300 is configured to eject, based on recording data that is input from the computer apparatus 308, ink from recording heads 305 to record an image.

In the recording apparatus 300, label paper to which a plurality of labels are temporarily affixed is used as a recording medium 301. The recording medium 301 is set in a state of being rolled into a roll shape. However, in the ink jet recording apparatus according to the present invention, as the recording medium, not only paper but also any material such as cloth, a plastic film, a metal plate, glass, ceramic, wood, or leather may be used insofar as the material can receive ink.

The recording apparatus 300 includes, as a conveyance unit configured to convey the recording medium 301, a conveying motor 303, a conveyance roller 302, a rotary encoder 310, and a roll motor 311. By driving the conveyance roller 302 by the conveying motor 303, the recording medium 301 can be conveyed at a uniform speed in a direction indicated by the arrow A. The rotary encoder 310 can detect the speed and the amount of conveyance of the recording medium 301. The recording medium 301 can be rolled again by the roll motor 311 in a direction opposite to the direction indicated by the arrow A. A sheet detection sensor 304 is a sensor configured to detect a specific portion of the recording medium 301. In the example illustrated in FIG. 6, leading edges of the respective labels that are temporarily affixed to the label paper are detected. The timing of recording an image can be determined based on the above-mentioned detection.

The recording apparatus 300 includes, in an upper portion thereof, four recording heads 305 and ink tanks 306 corresponding thereto, respectively. The four recording heads are recording heads configured to eject ink of black, cyan, magenta, and yellow, respectively.

The recording head 305 is a so-called line type head formed so as to have a width larger than a maximum recording width of the recording medium 301, and includes a plurality of nozzles configured to eject ink. The ink ejection orifices of the nozzles are open on a side of a lower surface of the recording head 305. The recording head 305 is disposed so that a longitudinal direction thereof is along a direction intersecting a direction of conveyance of the recording medium 301 (direction orthogonal to the direction indicated by the arrow A in FIG. 6), and the plurality of nozzles are arranged along the longitudinal direction to form the nozzle array.

In the recording apparatus 300, the conveyance roller 302 is driven by the conveying motor 303, and the conveyance roller 302 conveys the recording medium 301 at a uniform speed in the direction indicated by the arrow A. When the specific portion of the recording medium 301 is detected by the sheet detection sensor 304, based on the detection position, ink is ejected in sequence from the ink ejection orifices of the four recording heads 305. At this time, ink is supplied from the ink tanks 306 to the recording heads 305. In this way, when the recording medium 301 passes under the recording heads 305, ink is ejected from the plurality of nozzles of the recording heads 305 to record an image on the recording medium 301. Note that, the recording heads 305 are line type heads, and thus, eject ink in a state in which the recording heads 305 are fixed at a predetermined position. In other words, the recording heads 305 do not eject ink while being horizontally reciprocated like serial heads.

The recording apparatus 300 includes, as a recovery mechanism configured to carry out recovery operation of the recording head 305, a capping mechanism 307, a blade 309, and the like.

The recovery operation is an operation of causing the recording head 305 to recover so as to exhibit ejection performance that is as adequate as that in an initial state. The recovery operation may be, for example, suction recovery, pressurization recovery, preparatory ejection, or wipe recovery. The suction recovery is operation to remove, by suction with the capping mechanism 307, thickened ink in the nozzle of the recording head 305. The pressurization recovery is operation to discharge, by pressurization, thickened ink in the nozzle of the recording head 305 to the capping mechanism 307. The preparatory ejection is operation to discharge thickened ink in the nozzle to the capping mechanism 307 by ejection to stabilize an ink meniscus. The wipe recovery is an operation of wiping a face surface of the recording head with the blade 309 to remove dust and ink adhering to the face surface. Those kinds of recovery operation may be used in combination.

The capping mechanism 307 is a mechanism configured to cap ink ejection orifices of the recording heads 305, and is disposed below the recording heads 305. The recording heads 305 and the capping mechanism 307 are configured to relatively move in right and left directions in FIG. 6. On the other hand, the blade 309 is a member configured to wipe the face surfaces of the recording heads 305, and is disposed below the recording heads 305.

When the suction recovery is performed, in a state in which the recording head 305 is capped by the capping mechanism 307, inside of a buffer tank (not shown) of the capping mechanism 307 is depressurized by a tube pump (not shown). In this way, thickened ink in the nozzle of the recording head 305 is removed by suction with the capping mechanism 307, to thereby refresh the inside of the nozzle.

When the pressurization recovery is performed, in a state in which the recording head 305 is capped by the capping mechanism 307, the inside of the nozzle of the recording head 305 is pressurized. In this way, thickened ink in the nozzle is discharged into a cap of the capping mechanism 307 by pressurization, to thereby refresh the inside of the nozzle.

When the wipe recovery is performed, the blade 309 is driven by a blade motor (not shown), and the face surface of the nozzle of the recording head 305 is wiped. Further, pressurization recovery (preparatory ejection) is performed. In this way, the face surface of the nozzle is cleaned and a meniscus in the ink ejection orifice is stabilized.

Note that, ink accumulated in the capping mechanism 307 by those kinds of recovery operation is sucked by a tube pump (not shown) when the accumulation reaches a predetermined amount, and thus discarded in a waste ink tank (not shown).

(2-3) Control System

Figure 7:
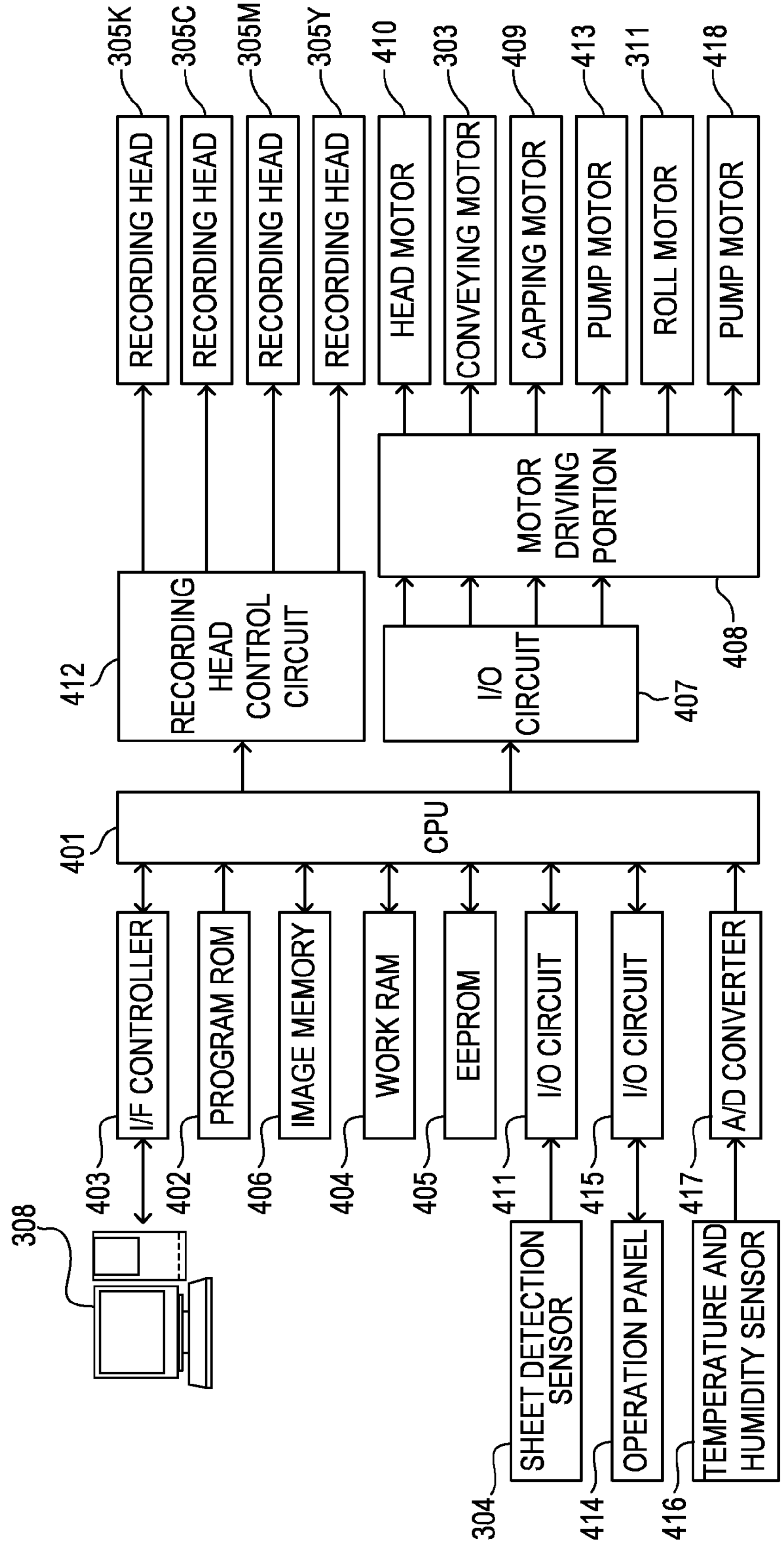
FIG. 7 is a block diagram illustrating a control system of the recording apparatus illustrated in FIG. 6.

Next, control of the ink jet recording apparatus will be described. FIG. 7 is a block diagram illustrating a control system of the recording apparatus illustrated in FIG. 6. The recording apparatus includes, in addition to a recording mechanism including the recording head, control system components such as a central processing unit (CPU), a USB interface portion, and a ROM. A CPU 401 runs a program stored in a program ROM 402 to control portions of the recording apparatus. The program ROM 402 stores a program and data for controlling the recording apparatus. Processing by the recording apparatus is realized by the CPU 401 which reads and runs a program in the program ROM 402.

The recording data that is output from the computer apparatus 308 is input to an interface controller 403 of the recording apparatus. Commands for instructing the number, the kind, the size, and the like of the recording medium (labels) are also input to the interface controller 403 and are analyzed. In addition to analysis of those commands, the CPU 401 executes arithmetic processing of controlling the entire recording apparatus, such as input of recording data, recording operation, and handling of a recording medium. The arithmetic processing is executed based on processing programs stored in the program ROM 402. The programs include a program corresponding to a procedure in a flowchart of FIG. 8 to be described below. Further, as a work memory for the CPU 401, a work RAM 404 is used. An EEPROM 405 is a rewritable nonvolatile memory. In the EEPROM 405, parameters unique to the recording apparatus are stored, such as time at which the previous recovery operation is carried out, and correction values for finely adjusting distances among the plurality of recording heads and a recording position in the direction of conveyance (registration in a longitudinal direction).

More specifically, the CPU 401 analyzes the input commands, and after that, expands image data of respective color components of the recording data into a bitmap in an image memory 406. Based on the data, an image is rendered. Further, the CPU 401 controls the conveying motor 303, the roll motor 311, a capping motor 409, a head motor 410, and a pump motor 418 via an input/output circuit 407 and a motor driving portion 408. The capping motor 409 is a motor configured to drive the capping mechanism 307. The head motor 410 is a motor configured to move recording heads 305K, 305Y, 305M, and 305C. The pump motor 418 is a motor configured to drive the tube pump. The recording heads 305K, 305Y, 305M, and 305C are moved among a capping position, a recording position, and a recovery position. The capping position is a position at which capping is carried out by the capping mechanism 307. The recording position is a position at which an image is recorded. The recovery position is a position at which the recovery operation is carried out.

When an image is recorded by the recording apparatus, as illustrated in FIG. 6, the conveyance roller 302 is driven by the conveying motor 303 to convey the recording medium 301 (in the illustrated example, label paper) at a uniform speed. Then, the rotary encoder 310 detects the speed and the amount of conveyance of the recording medium 301. In the control system illustrated in FIG. 7, in order to determine the timing of recording an image relative to the recording medium that is conveyed at the uniform speed, the sheet detection sensor 304 detects a leading edge of a label. A detection signal from the sheet detection sensor 304 is input to the CPU 401 via an input/output circuit 411. When the recording medium is conveyed by the conveying motor, in synchronization with a signal from the rotary encoder (not shown), the CPU 401 reads image data for the respective colors in sequence from the image memory 406. The image data is transferred via a recording head control circuit 412 to any one of the recording heads 305K, 305Y, 305M, and 305C corresponding thereto. Thus, the recording heads 305K, 305Y, 305M, and 305C eject ink based on the image data.

Operation of a pump motor 413 configured to drive a pump is controlled via the input/output circuit 407 and the motor driving portion 408. An operating panel 414 is connected to the CPU 401 via an input/output circuit 415. Environmental temperature and environmental humidity of the recording apparatus are detected by a temperature and humidity sensor 416, and are input to the CPU 401 via an A/D converter 417.

(2-4) Recovery Sequence

When the environmental temperature becomes 40° C. or more and water evaporates, ink is more liable to stick to the recording head. Therefore, it is preferred to perform a recovery sequence of recovering the face surface of the recording head when water evaporates in an open state of the head in which the recording head is uncapped.

Figure 8:
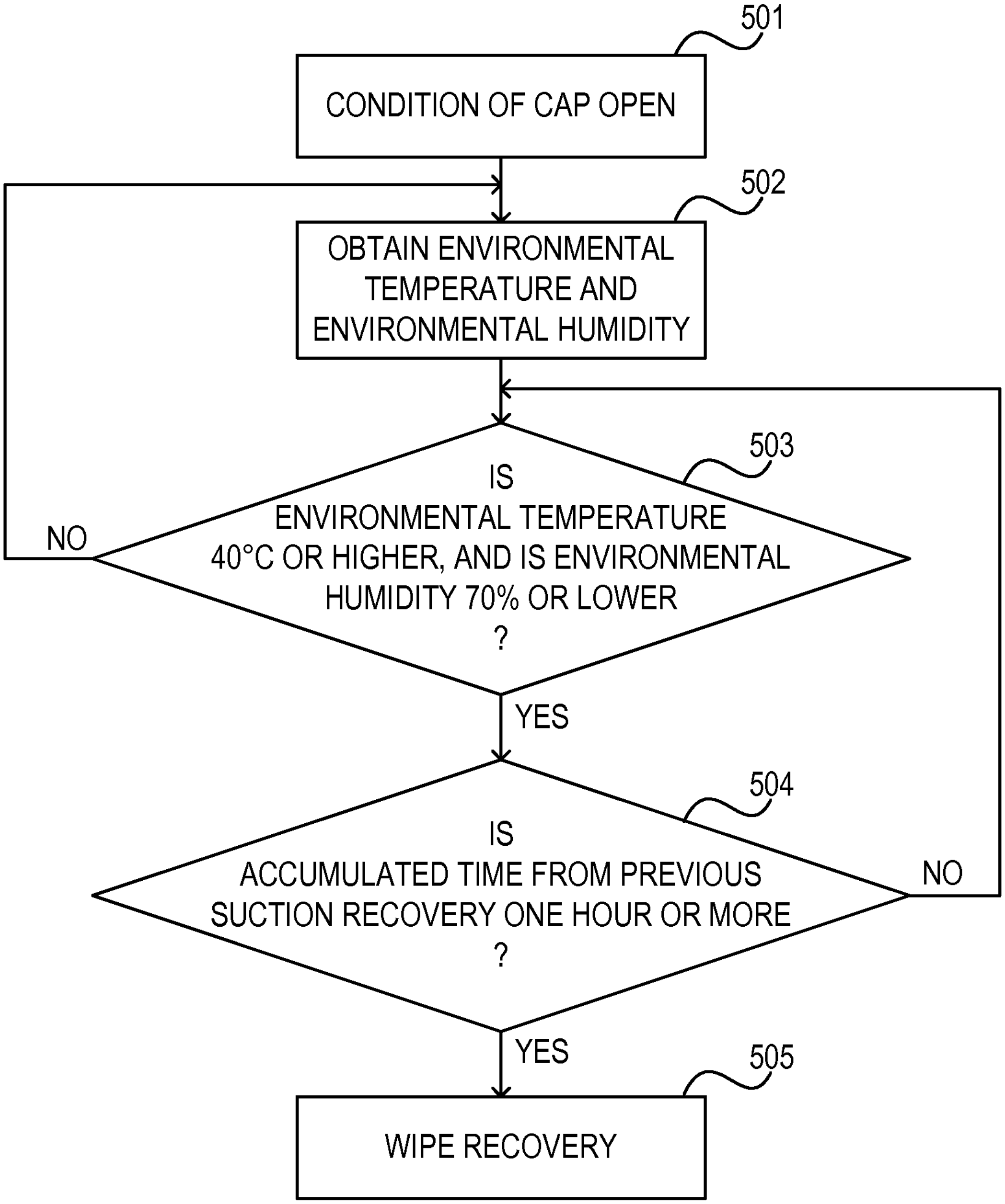
FIG. 8 is a flowchart illustrating steps of a recovery sequence of the recording head.

FIG. 8 is a flowchart illustrating steps of the recovery sequence of the recording head. The recovery sequence illustrated in FIG. 8 is triggered under a condition that the recording head is uncapped, i.e., under a cap open condition (Condition 501). When the recovery sequence is triggered, the temperature and humidity sensor obtains (detects) the environmental temperature and the environmental humidity of the recording apparatus (Step 502). As a result of the detection, when the environmental temperature is 40° C. or higher and the environmental humidity is 70% or lower (Condition 503), and at the same time, an accumulated time from the previous suction recovery is one hour or more (Condition 504), a pressurization recovery (preparatory ejection) of refreshing ink in the nozzle and a wipe recovery of wiping and cleaning the face surface of the nozzle are carried out (Step 505). Note that, Condition 504 is reset when the suction recovery is carried out.

(3) Ink Jet Recording Method

In an ink jet recording method according to the present invention, the ink jet recording apparatus according to the present invention is used and the recording head is driven at a drive frequency of 1 kHz to kHz to carry out recording. As described above, by driving the recording head at a drive frequency of 1 kHz or more, the amount of ink applied per unit time can be increased to enable printing of a high quality image at high speed. On the other hand, by driving the recording head at a drive frequency of 10 kHz or less, an inconvenience can be inhibited that the stability of ejection is reduced due to insufficient supply amount of ink to the nozzles with respect to the amount of ejected ink even in high speed printing. In order to obtain the above-mentioned effects with more reliability, it is preferred that the drive frequency be 3 kHz or more and 10 kHz or less. Further, according to the recording method of the present invention, even when the recording head is driven with a drive frequency which is as high as 6 kHz or more and 10 kHz or less, the stability of ejection is less liable to be reduced and ejection failure of a nozzle (non-ejection nozzle) is less liable to occur.

EXAMPLES

Now, the present invention is more specifically described by way of Examples and Comparative Examples. However, the present invention is not limited to only the constitutions of Examples below. Note that, "part(s)" and "%" in the following description refer to "part(s) by mass" and "mass %", respectively, unless otherwise stated.

Preparation of Ink

Preparation Example 1

An ink 1 to be filled into a recording head of Example 1 was prepared. 35.0 Parts of a 10% aqueous solution of a Food Black 2 dye (Food Black 2 dye solid content: 3.5 parts), 7.0 parts of glycerin, 3.0 parts of triethylene glycol, 5.0 parts of 2-pyrrolidone, 22.5 parts of a 40% aqueous solution of ethylene urea (ethylene urea solid content: 9 parts), 0.2 part of an acetylene glycol-based surfactant, and 27.3 parts of pure water (ion-exchanged water) were loaded into a container to set the amount of the entirety to 100 parts. The contents were stirred with a propeller stirring machine for 30 minutes or more and then filtered with a filter having a pore diameter of 0.2 μm to provide the ink 1.

The compound (1) represented by the general formula (1) having an average of U+V of 4 ("Acetylenol E40" manufactured by Kawaken Fine Chemicals Co., Ltd.) was used as an acetylene glycol-based surfactant (1). A "Pall Filter" manufactured by Pall Corporation was used as the filter having a pore diameter of 0.2 μm. Table 1 shows the composition and physical properties of the ink 1.

Preparation Examples 2 to 10

Inks 2 to 10 to be supplied to recording heads of Examples 2 to 6 and recording heads of Comparative Examples 1 to 4 were prepared. The inks 2 to 10 were obtained in the same manner as in Preparation Example 1 except that other components shown in Table 1 were used at ratios shown in Table 1. Table 1 shows the compositions and physical properties of the inks 2 to 10.

The compound (1) represented by the general formula (1) having an average of U+V of 6 ("Acetylenol E60" manufactured by Kawaken Fine Chemicals Co., Ltd.) was used as an acetylene glycol-based surfactant (II). The compound (1) having an average of U+V of 2 ("Surfynol 420" manufactured by Air Products and Chemicals, Inc.) was used as an acetylene glycol-based surfactant (III). The compound (1) having an average of U+V of 8 ("Acetylenol E81" manufactured by Kawaken Fine Chemicals Co., Ltd.) was used as an acetylene glycol-based surfactant (IV). The compound (1) having an average of U+V of 10 ("Acetylenol E100" manufactured by Kawaken Fine Chemicals Co., Ltd.) was used as an acetylene glycol-based surfactant (V). The compound (1) having an average of U+V of 0 ("Acetylenol E00" manufactured by Kawaken Fine Chemicals Co., Ltd.) was used as an acetylene glycol-based surfactant (VI).

TABLE 1

| | Ink | | | | | | | | | |
|---|---|---|---|---|---|---|---|---|---|---|
| | 1 | 2 | 3 | 4 | 5 | 6 | 7 | 8 | 9 | 10 |
| Food Black 2 | 3.5 | 3.5 | 3.5 | 3.5 | 3.5 | 3.5 | 3.5 | 3.5 | 3.5 | 3.5 |
| Glycerin | 7.0 | 7.0 | 7.0 | 7.0 | 5.0 | 5.0 | 8.0 | 7.0 | 7.0 | |
| Triethylene glycol | 3.0 | 3.0 | 3.0 | 3.0 | 5.0 | 5.0 | 4.0 | 3.0 | 3.0 | 10.0 |
| 2-Pyrrolidone | 5.0 | 5.0 | 5.0 | 5.0 | | | 5.0 | 5.0 | 5.0 | |
| Ethylene urea | 9.0 | 9.0 | 9.0 | 9.0 | 25.0 | 25.0 | 10.0 | 9.0 | 9.0 | |
| Triethylene glycol monomethyl ether | | | | | | | | | | 20.0 |

TABLE 1-continued

| | | | Ink | | | | | | | | | |
|---|---|---|---|---|---|---|---|---|---|---|---|---|
| | | | 1 | 2 | 3 | 4 | 5 | 6 | 7 | 8 | 9 | 10 |
| Benzotriazole | | | | | | | | | | | | 1.0 |
| Acetylene | (I) | U + V = 4 | 0.2 | | 0.1 | | 0.2 | 0.1 | 0.2 | | 0.1 | |
| glycol-based | (II) | U + V = 6 | | 0.2 | | 0.1 | | | | | | 2.0 |
| surfactant | (III) | U + V = 2 | | | 0.1 | | | 0.1 | | | | |
| | (IV) | U + V = 8 | | | | 0.1 | | | | | | |
| | (V) | U + V = 10 | | | | | | | | 0.2 | | |
| | (VI) | U + V = 0 | | | | | | | | | 0.1 | |
| Pure Water | | | 72.3 | 72.3 | 72.3 | 72.3 | 61.3 | 61.3 | 69.3 | 72.3 | 72.3 | 63.5 |
| Viscosity (mN/m) | | | 1.9 | 1.9 | 1.9 | 1.9 | 2.8 | 2.8 | 3.2 | 1.9 | 1.9 | 3.1 |
| Average addition number of moles of EO | | | 4 | 6 | 3 | 7 | 4 | 3 | 4 | 10 | 2 | 6 |

As the ink jet recording apparatus, the recording apparatus 300 illustrated in FIG. 6, specifically, a thermal ink jet recording apparatus ("LXD-5500" manufactured by CANON FINETECH INC.) was used. As the recording head, a recording head for the above-mentioned ink jet recording apparatus was used. Specifically, the recording head having the structure illustrated in FIG. 1A to FIG. 1C and FIG. 2A to FIG. 2C was used. In the recording head, a water-repellent region was formed on the periphery of each of the ink ejection orifices. Concrete specifications of the recording head are shown in Table 2. Each of the inks 1 to 10 was supplied to the ink tank, the ink tank was connected to the recording apparatus 300 illustrated in FIG. 6, and the inks 1 to 10 was supplied into nozzle flow paths of the recording head under suction. Recording heads 1 to 10 correspond to the inks 1 to 10, respectively.

TABLE 2

| | |
|---|---|
| Length of Nozzle Array | 4 inches |
| Total Number of Nozzles per Nozzle Array | 4,800 |
| Amount of Ejected Ink | 7.5 ng |
| Length of Front Portion of Nozzle (L1) | 80 μm |
| Length of Back Portion of Nozzle (L2) | 135 μm |
| Total Length of Nozzle (L1 + L2) | 215 μm |
| Width of Ink Ejection Orifice | 12 μm |
| Height of Ink Ejection Orifice | 16.7 μm |
| Opening Area of Ink Ejection Orifice | 200 $\mu m^2$ |

As a recording medium, a matte label manufactured by CANON FINETECH INC. was used.

(Evaluation of Stability of Ejection)

The stability of ejection of the recording head was evaluated by whether ejection failure of a nozzle occurs or not. When the stability of ejection of the recording head is low, the amount of supplied ink cannot keep up with the amount of ejected ink. As a result, the amount of ejected ink becomes smaller and smaller, and, in the end, ejection failure of a nozzle occurs.

Specifically, using the ink jet recording apparatus and under an environment at a temperature of 15° C. and at a relative humidity of 10%, an operation of continuously printing a solid pattern on 200 sheets of the recording medium was performed three times. In this case, the stability of ejection was evaluated by visually checking whether ejection failure of a nozzle occurred or not. Conditions of the printing are shown in Table 3.

TABLE 3

| Printing Conditions | 1 | 2 | 3 |
|---|---|---|---|
| Conveyance Speed (mm/sec) | 200 | 200 | 200 |
| Amount of Ejected Ink (% duty) | 50 | 75 | 100 |
| Drive Frequency (kHz) | 4.7 | 7.1 | 9.4 |

(Evaluation Criteria)

With regard to each cycle of continuous printing on 200 sheets, when no ejection failure of a nozzle occurred, the result of the evaluation was "no ejection failure of a nozzle", and, when ejection failure of at least one nozzle occurred, the result of the evaluation was "ejection failure of a nozzle". Further, according to the following evaluation criteria, the stability of ejection was comprehensively evaluated. In the following evaluation criteria, "○" and "Δ" are allowable levels, while "x" is an unallowable level. The result is shown in Table 4.

○: there is no ejection failure of a nozzle with regard to all the three cycles of printing Δ: there is ejection failure of a nozzle with regard to one cycle of the three cycles of printing x: there is ejection failure of a nozzle with regard to two or three cycles of the three cycles of printing

TABLE 4

| | Recording | Drive Frequency (kHz) | | |
|---|---|---|---|---|
| | Head | 4.7 | 7.1 | 9.4 |
| Example 1 | 1 | ○ | ○ | ○ |
| Example 2 | 2 | ○ | ○ | ○ |
| Example 3 | 3 | ○ | ○ | Δ |
| Example 4 | 4 | ○ | ○ | Δ |
| Example 5 | 5 | ○ | ○ | Δ |
| Example 6 | 6 | ○ | Δ | Δ |
| Comparative Example 1 | 7 | Δ | Δ | x |
| Comparative Example 2 | 8 | Δ | Δ | x |
| Comparative Example 3 | 9 | Δ | Δ | x |
| Comparative Example 4 | 10 | Δ | x | x |

As shown in Table 4, the recording heads of Examples 1 to 6 (recording heads 1 to 6) were evaluated as "○" or "Δ" at any one of the drive frequencies and the stability of ejection was satisfactory. With regard to the recording head of Example 1 or 2 (recording head 1 or 2) filled with ink which contained one or two or more kinds of the compounds (1) in a state in which the addition number of moles of EO (U+V) of the entirety thereof was 3 or more and 7 or less and the viscosity was 2.5 mPa·s or less, the evaluation was "○" even when the drive frequency was the highest, that is, 9.4 kHz, and the stability of ejection was extremely satisfactory.

With regard to the recording head of Comparative Example 1 (recording head 7) filled with ink having a viscosity of more than 3.0 mN/m, the recording head of Comparative Example 2 (recording head 8) filled with ink which contained the compound (1) having the addition number of moles of EO (U+V) of more than 7, and the recording head of Comparative Example 3 (recording head 9) filled with ink which contained the compound (1) having the addition number of moles of EO (U+V) of less than 3 had stabilities of ejection at allowable levels when the drive frequency was 4.7 kHz and 7.1 kHz, but the stabilities of ejection were less satisfactory compared with those of the recording heads of Examples 1 to 6. Further, the stabilities of ejection of the recording heads of Comparative Examples 1 to 3 were at unallowable levels when the drive frequency was the highest, that is, 9.4 kHz.

Further, with regard to the recording head of Comparative Example 4 (recording head 10) filled with ink which contained the compound (1) having the addition number of moles of EO (U+V) of more than 7 and which had a viscosity of more than 3.0 mN/m, the stability of ejection when the drive frequency was 4.7 kHz was at an allowable level, but the stability of ejection was less satisfactory compared with those of the recording heads of Examples 1 to 6. Further, the stability of ejection of the recording head of Comparative Example 4 was at an unallowable level when the drive frequency was as high as 7.1 kHz and 9.4 kHz.

The recording head according to the present invention can be suitably used as a recording head for ink jet recording, in particular, as a line type head and a gas-liquid separation type recording head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-185451, filed Sep. 6, 2013, which is hereby incorporated by reference herein in its entirety.

What is claimed is:

1. A recording head for ink jet recording, comprising:

a nozzle array including a plurality of nozzle flow paths partitioned by nozzle walls;

a plurality of ink ejection orifices communicating with the plurality of nozzle flow paths, respectively;

heaters for ink ejection disposed in the plurality of nozzle flow paths, respectively; and ink for ink jet recording, with which an internal space of the recording head communicating with the plurality of ink ejection orifices is filled, the ink containing a coloring material, an acetylene glycol-based surfactant, and water, the acetylene glycol-based surfactant containing at least an ethylene oxide adduct of the acetylene glycol, an average addition number of moles of ethylene oxide of a whole of the acetylene glycol-based surfactant being 3 or more and 7 or less, the ink having a viscosity of 1.5 mPa·s or more and 3.0 mPa·s or less, wherein the recording head comprises a line type head having an opening area of each of the plurality of ink ejection orifices of 100 $\mu m^2$ or more and 350 $\mu m^2$ or less, a number of nozzles in the nozzle array of 1,200 or more per inch, and a length of the nozzle array of 2 inches or more, the line type head being driven at a drive frequency of 1 kHz or more and 10 kHz or less.

2. A recording head according to claim 1, wherein the ink further contains a water-soluble compound, and wherein the water-soluble compound is at least one kind selected from the group consisting of a water-soluble organic solvent and a water-soluble compound that is solid at 25° C.

3. A recording head according to claim 1, further comprising:

a common liquid chamber communicating with the plurality of nozzle flow paths forming the nozzle array;

a liquid supply port communicating with the common liquid chamber;

a main liquid supply chamber communicating with the liquid supply port;

a liquid supply path communicating with the main liquid supply chamber;

a liquid supply chamber communicating with the liquid supply path;

a supply filter provided so as to partition the liquid supply chamber into a first liquid supply chamber and a second liquid supply chamber from an upstream side along a flow during supply of liquid;

a gas-liquid separation portion provided in a part of the main liquid supply chamber; and an air chamber communicating with the gas-liquid separation portion, wherein the plurality of nozzle flow paths, the common liquid chamber, the liquid supply port, the main liquid supply chamber, the liquid supply path, the liquid supply chamber, the supply filter, the gas-liquid separation portion, and the air chamber are disposed on a plane parallel to a plane including an arrangement direction of the plurality of nozzle flow paths and an ejection direction of the liquid, and wherein the main liquid supply chamber, the liquid supply path, the supply filter, the gas-liquid separation portion, and the air chamber are disposed without being stacked on top of each other.

4. An ink jet recording apparatus, comprising:

ding head for ink jet recording as recited in claim 1; and an ink storage portion configured to store ink to be supplied to the recording head.

5. An ink jet recording method, comprising driving a recording head of an ink jet recording apparatus as recited in claim 4 at a drive frequency of 1 kHz or more and 10 kHz or less to carry out recording on a recording medium.

* * * * *